(12) United States Patent
Ranum et al.

(10) Patent No.: US 12,436,154 B2
(45) Date of Patent: Oct. 7, 2025

(54) DETECTION OF ANTIBODIES AGAINST RAN PROTEINS FROM SERUM AND TISSUE LYSATES

(71) Applicant: University of Florida Research Foundation, Incorporated, Gainesville, FL (US)

(72) Inventors: Laura Ranum, Gainesville, FL (US); Lauren A. Laboissonniere, Gainesville, FL (US); Lien Nguyen, Gainesville, FL (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 854 days.

(21) Appl. No.: 17/761,764

(22) PCT Filed: Sep. 18, 2020

(86) PCT No.: PCT/US2020/051671
§ 371 (c)(1),
(2) Date: Mar. 18, 2022

(87) PCT Pub. No.: WO2021/055880
PCT Pub. Date: Mar. 25, 2021

(65) Prior Publication Data
US 2022/0373559 A1    Nov. 24, 2022

Related U.S. Application Data

(60) Provisional application No. 62/904,612, filed on Sep. 23, 2019, provisional application No. 62/903,689, filed on Sep. 20, 2019.

(51) Int. Cl.
| | | |
|---|---|---|
| G01N 33/68 | (2006.01) | |
| G01N 21/66 | (2006.01) | |
| G01N 33/543 | (2006.01) | |

(52) U.S. Cl.
CPC ......... G01N 33/6854 (2013.01); G01N 21/66 (2013.01); G01N 33/54366 (2013.01); *G01N 2458/30* (2013.01); *G01N 2800/52* (2013.01)

(58) Field of Classification Search
CPC ............... G01N 21/66; G01N 2458/30; G01N 2800/52; G01N 33/54366; G01N 33/582;
(Continued)

(56) References Cited

U.S. PATENT DOCUMENTS

| | | |
|---|---|---|
| 5,011,912 A | 4/1991 | Hopp et al. |
| 6,204,008 B1 | 3/2001 | Borneman et al. |

(Continued)

FOREIGN PATENT DOCUMENTS

| | | |
|---|---|---|
| CA | 3137666 A1 | 11/2020 |
| EP | 2837390 A1 | 2/2015 |

(Continued)

OTHER PUBLICATIONS

U.S. Appl. No. 17/322,604, filed May 17, 2021, Ranum et al.
(Continued)

*Primary Examiner* — Jennifer Wecker
(74) *Attorney, Agent, or Firm* — Wolf, Greenfield & Sacks, P.C.

(57) ABSTRACT

Aspects of the disclosure relate to methods and compositions (e.g., kits) for detecting anti-repeat-associated non-ATG (RAN) protein antibodies in a subject (e.g., a subject that has been administered a therapeutic anti-RAN protein antibody or a vaccine against a disease or disorder associated with RAN protein expression, translation, and/or accumulation, for example amyotrophic lateral sclerosis (ALS) and/or frontotemporal dementia (FTD)). In some embodiments, methods described by the disclosure comprise detecting one or more anti-RAN protein antibodies in a biological sample obtained from a subject by an electrochemilumines-
(Continued)

cence-based immunoassay using one or more target di-amino acid repeat peptides. In some embodiments, the disclosure relates to kits comprising one or more di-amino acid repeat peptides and an electrochemiluminescence-based immunoassay plate and/or reagents.

20 Claims, 5 Drawing Sheets

Specification includes a Sequence Listing.

(58) Field of Classification Search
CPC . G01N 33/6854; C07K 16/18; C07K 2317/34
See application file for complete search history.

(56) References Cited

U.S. PATENT DOCUMENTS

| | | |
|---|---|---|
| 6,326,151 B1 | 12/2001 | Katze et al. |
| 6,342,581 B1 | 1/2002 | Rosen et al. |
| 7,008,796 B2 | 3/2006 | Wohlstadter et al. |
| 7,481,997 B1 | 1/2009 | Hardy |
| 8,993,633 B2 | 3/2015 | Megeney et al. |
| 9,448,232 B2 | 9/2016 | Petrucelli et al. |
| 10,295,547 B2 | 5/2019 | Ranum et al. |
| 10,509,045 B2 | 12/2019 | Ranum et al. |
| 10,663,475 B2 | 5/2020 | Ranum et al. |
| 10,940,161 B2 | 3/2021 | Ranum et al. |
| 11,034,974 B2 | 6/2021 | Ling et al. |
| 11,345,911 B2 | 5/2022 | Ranum et al. |
| 11,903,910 B2 | 2/2024 | Ranum et al. |
| 12,025,622 B2 | 7/2024 | Ranum et al. |
| 2002/0165355 A1 | 11/2002 | Meheus et al. |
| 2003/0233675 A1 | 12/2003 | Cao et al. |
| 2005/0042657 A1 | 2/2005 | Weese-Mayer et al. |
| 2006/0068434 A1 | 3/2006 | Stoerker |
| 2007/0004729 A1 | 1/2007 | Timmer et al. |
| 2007/0014810 A1 | 1/2007 | Baker et al. |
| 2007/0036760 A1 | 2/2007 | Wilson et al. |
| 2007/0093426 A1 | 4/2007 | Wormser |
| 2008/0188457 A1 | 8/2008 | Barlow et al. |
| 2008/0227699 A1 | 9/2008 | Chiba et al. |
| 2008/0248099 A1 | 10/2008 | Ishii |
| 2009/0074721 A1 | 3/2009 | Kim et al. |
| 2009/0143418 A1 | 6/2009 | Dixon et al. |
| 2009/0148866 A1 | 6/2009 | Datwyler et al. |
| 2009/0312395 A1 | 12/2009 | El-Tanani et al. |
| 2010/0298280 A1 | 11/2010 | Kioschis-Schneider et al. |
| 2012/0076785 A1 | 3/2012 | Nikolaev et al. |
| 2012/0094299 A1 | 4/2012 | Ranum et al. |
| 2012/0220534 A1 | 8/2012 | Levin et al. |
| 2013/0085169 A1 | 4/2013 | Baghdoyan et al. |
| 2013/0115603 A9 | 5/2013 | Ranum et al. |
| 2014/0100282 A1 | 4/2014 | Wong |
| 2014/0336133 A1 | 11/2014 | Miller et al. |
| 2015/0361166 A1 | 12/2015 | Edbauer et al. |
| 2016/0025747 A1 | 1/2016 | Ranum et al. |
| 2016/0096800 A1 | 4/2016 | Walter et al. |
| 2016/0346297 A1 | 12/2016 | Sheehan |
| 2018/0050001 A1 | 2/2018 | During et al. |
| 2018/0088111 A1* | 3/2018 | Ni ................... G01N 33/566 |
| 2018/0292416 A1 | 10/2018 | Ranum et al. |
| 2019/0142858 A1 | 5/2019 | Ranum et al. |
| 2019/0153445 A1 | 5/2019 | Seow et al. |
| 2019/0285652 A1 | 9/2019 | Ranum et al. |
| 2020/0140846 A1 | 5/2020 | Ranum et al. |
| 2020/0206255 A9 | 7/2020 | Ranum et al. |
| 2020/0232925 A1 | 7/2020 | Ranum et al. |
| 2020/0241013 A1 | 7/2020 | Ranum et al. |
| 2020/0268691 A1 | 8/2020 | Ranum et al. |
| 2020/0341012 A1 | 10/2020 | Ranum et al. |
| 2020/0355701 A1* | 11/2020 | Van Meter ......... G01N 33/6848 |
| 2021/0236535 A1 | 8/2021 | Ranum et al. |
| 2021/0285970 A1 | 9/2021 | Ranum et al. |
| 2023/0002753 A1 | 1/2023 | Ranum et al. |
| 2023/0218730 A1 | 7/2023 | Ranum et al. |
| 2023/0288434 A1 | 9/2023 | Ranum et al. |
| 2024/0069039 A1 | 2/2024 | Ranum et al. |
| 2024/0269093 A1 | 8/2024 | Ranum et al. |
| 2024/0393348 A1 | 11/2024 | Ranum et al. |
| 2025/0041247 A1 | 2/2025 | Ranum et al. |

FOREIGN PATENT DOCUMENTS

| | | | |
|---|---|---|---|
| EP | 2948471 A1 | 12/2015 | |
| EP | 3440100 A1 | 2/2019 | |
| JP | 2004-518437 A | 6/2004 | |
| JP | 2004-520803 A | 7/2004 | |
| JP | 2007-507223 A | 3/2007 | |
| JP | 2012-501193 A | 1/2012 | |
| JP | 2016-515208 A | 5/2016 | |
| JP | 2016-180665 A | 10/2016 | |
| JP | 2017-019773 A | 1/2017 | |
| JP | 2017-205118 A | 11/2017 | |
| JP | 2019-515894 A | 6/2019 | |
| WO | WO 2001/75067 A2 | 10/2001 | |
| WO | WO 2001/81581 A2 | 11/2001 | |
| WO | WO 2002/040672 A2 | 5/2002 | |
| WO | WO 2002/062945 A2 | 8/2002 | |
| WO | WO 2005/033321 A2 | 4/2005 | |
| WO | WO 2006/083800 A2 | 8/2006 | |
| WO | WO 2009/144480 A1 | 12/2009 | |
| WO | WO 2010/115033 A2 | 10/2010 | |
| WO | WO 2010/132982 A1 | 11/2010 | |
| WO | WO 2011/052906 A2 | 5/2011 | |
| WO | WO-2012159754 A2 * | 11/2012 | ............. A61K 39/00 |
| WO | WO 2013/030588 A1 | 3/2013 | |
| WO | WO 2013/061163 A2 | 5/2013 | |
| WO | WO 2013/172537 A2 | 11/2013 | |
| WO | WO 2014/114303 A1 | 7/2014 | |
| WO | WO 2014/114660 A1 | 7/2014 | |
| WO | WO 2014/116865 A1 | 7/2014 | |
| WO | WO 2014/159247 A1 | 10/2014 | |
| WO | WO 2016/025692 A1 | 2/2016 | |
| WO | WO 2017/055612 A1 | 4/2017 | |
| WO | WO 2017/176813 A1 | 10/2017 | |
| WO | WO 2018/035408 A1 | 2/2018 | |
| WO | WO 2018/195110 A1 | 10/2018 | |
| WO | WO 2019/060918 A1 | 3/2019 | |
| WO | WO 2019/067587 A1 | 4/2019 | |
| WO | WO 2021/007110 A1 | 1/2021 | |
| WO | WO 2021/055880 A1 | 3/2021 | |
| WO | WO 2021/231887 A1 | 11/2021 | |

OTHER PUBLICATIONS

U.S. Appl. No. 16/695,717, filed Nov. 26, 2019, Ranum et al.
U.S. Appl. No. 17/159,288, filed Jan. 27, 2021, Ranum et al.
U.S. Appl. No. 17/826,224, filed May 27, 2022, Ranum et al.
U.S. Appl. No. 16/650,721, filed Mar. 25, 2020, Ranum et al.
U.S. Appl. No. 16/650,016, filed Mar. 24, 2020, Ranum et al.
U.S. Appl. No. 17/762,543, filed Mar. 22, 2022, Ranum et al.
U.S. Appl. No. 17/767,549, filed Apr. 8, 2022, Ranum et al.
EP 14776090.4, Sep. 30, 2016, Extended European Search Report.
PCT/US2014/022670, Aug. 22, 2014, International Search Report and Written Opinion.
PCT/US2014/022670, Sep. 24, 2015, International Preliminary Report on Patentability.
PCT/US2016/034738, Sep. 21, 2016, International Search Report and Written Opinion.
PCT/US2016/034738, Dec. 14, 2017, International Preliminary Report on Patentability.
EP 17779695.0, Oct. 18, 2019, Supplementary Partial European Search Report.
EP 17779695.0, Jan. 7, 2020, Extended European Search Report.
PCT/US2017/026020, Jul. 7, 2017, International Search Report and Written Opinion.
PCT/US2017/062020, Oct. 18, 2018, International Preliminary Report on Patentability.

(56) References Cited

OTHER PUBLICATIONS

EP 18786964.9, Dec. 17, 2020, Extended European Search Report.
PCT/US2018/028015, Jul. 27, 2018, International Search Report and Written Opinion.
PCT/US2018/028015, Oct. 31, 2019, International Preliminary Report on Patentability.
EP 18860923.4, Nov. 26, 2021, Extended European Search Report.
PCT/US2018/052913, Jan. 15, 2019, International Search Report and Written Opinion.
PCT/US2018/052913, Apr. 9, 2020, International Preliminary Report on Patentability.
EP 18859783.5, Jun. 11, 2021, Extended European Search Report.
PCT/US2018/052745, Dec. 6, 2018, International Search Report and Written Opinion.
PCT/US2018/052745, Apr. 9, 2020, International Preliminary Report on Patentability.
PCT/US2020/051671, Nov. 30, 2020, Invitation to Pay Additional Fees.
PCT/US2020/051671, Feb. 9, 2021, International Search Report and Written Opinion.
PCT/US2020/051671, Mar. 31, 2022, International Preliminary Report on Patentability.
PCT/US2020/051670, Dec. 31, 2020, International Search Report and Written Opinion.
PCT/US2020/051670, Apr. 7, 2022, International Preliminary Report on Patentability.
PCT/US2020/054976, Feb. 19, 2021, Invitation to Pay Additional Fees.
PCT/US2020/054976, Apr. 23, 2021, International Search Report and Written Opinion.
PCT/US2020/054976, Apr. 21, 2022, International Preliminary Report on Patentability.
Extended European Search Report, mailed Sep. 30, 2016, in connection with Application No. EP 14776090.4.
International Search Report and Written Opinion, mailed Aug. 22, 2014, in connection with Application No. PCT/US2014/022670.
International Preliminary Report on Patentability, mailed Sep. 24, 2015, in connection with Application No. PCT/US2014/022670.
International Search Report and Written Opinion, mailed Sep. 21, 2016, in connection with Application No. PCT/US2016/034738.
International Preliminary Report on Patentability, mailed Dec. 14, 2017, in connection with Application No. PCT/US2016/034738.
Supplementary Partial European Search Report, mailed Oct. 18, 2019, in connection with Application No. EP 17779695.0.
Extended European Search Report, mailed Jan. 7, 2020, in connection with Application No. EP 17779695.0.
International Search Report and Written Opinion, mailed Jul. 7, 2017, in connection with Application No. PCT/US2017/026020.
International Preliminary Report on Patentability, mailed Oct. 18, 2018, in connection with Application No. PCT/US2017/026020.
Extended European Search Report, mailed Dec. 17, 2020, in connection with Application No. EP 18786964.9.
International Search Report and Written Opinion, mailed Jul. 27, 2018, in connection with Application No. PCT/US2018/028015.
International Preliminary Report on Patentability, mailed Oct. 31, 2019, in connection with Application No. PCT/US2018/028015.
Extended European Search Report, mailed Nov. 26, 2021, in connection with Application No. EP 18860923.4.
International Search Report and Written Opinion, mailed Jan. 15, 2019, in connection with Application No. PCT/US2018/052913.
International Preliminary Report on Patentability, mailed Apr. 9, 2020, in connection with Application No. PCT/US2018/052913.
Extended European Search Report, mailed Jun. 11, 2021, in connection with Application No. EP 18859783.5.
International Search Report and Written Opinion, mailed Dec. 6, 2018, in connection with Application No. PCT/US2018/052745.
International Preliminary Report on Patentability, mailed Apr. 9, 2020, in connection with Application No. PCT/US2018/052745.
Invitation to Pay Additional Fees, mailed Nov. 30, 2020, in connection with Application No. PCT/US2020/051671.
International Search Report and Written Opinion, mailed Feb. 9, 2021, in connection with Application No. PCT/US2020/051671.
International Preliminary Report on Patentability, mailed Mar. 31, 2022, in connection with Application No. PCT/US2020/051671.
International Search Report and Written Opinion, mailed Dec. 31, 2020, in connection with Application No. PCT/US2020/051670.
International Preliminary Report on Patentability, mailed Apr. 7, 2022, in connection with Application No. PCT/US2020/051670.
Invitation to Pay Additional Fees, mailed Feb. 19, 2021, in connection with Application No. PCT/US2020/054976.
International Search Report and Written Opinion, mailed Apr. 23, 2021, in connection with Application No. PCT/US2020/054976.
International Preliminary Report on Patentability, mailed Apr. 21, 2022, in connection with Application No. PCT/US2020/054976.
[No Author Listed] Amersham ECL Western Blotting Detection Reagent. Retrieved from the internet under https://www.cytivalifesciences.com/en/us/shop/protein-analysis/blotting-and-detection/blotting-standards-and-reagents/amersham-ecl-western-blotting-detection-reagent-p-05748 on Feb. 22, 2022, 6 pages.
[No Author Listed] EBNA1—Epstein-Barr nuclear antigen 1—Epstein-Barr virus (strain GD1) (HHV-4)—EBNA1 gene & protein, Jan. 2018. 2018. Retrieved from the internet under https://www.uniprot.org/uniprot/Q3KSS4 on Sep. 12, 2018. 6 pages.
[No Author Listed], Abstracts. Medizinische Genetik, Berufsverband Nedizinische Genetik, Muchen, DE. Medgen. Mar. 4, 2016; 28(1):84-232. DOI: 10.1007/s11825-016-0083-5.
Ash et al., Unconventional translation of C9ORF72 GGGGCC expansion generates insoluble polypeptides specific to c9FTD/ALS. Neuron. Feb. 20, 2013;77(4):639-46. doi: 10.1016/j.neuron.2013.02.004. Epub Feb. 12, 2013.
Ashizawa et al., GGCCTG repeats put a hex on Purkinje cells and motor neurons in SCA36. Neurology. Jul. 24, 2012;79(4):302-3. doi: 10.1212/WNL.0b013e31826043d9. Epub Jun. 27, 2012.
Ayhan et al., SCA8 Ran polySer protein preferentially accumulates in white matter regions and is regulated by eIF3F. EMBO J. Oct. 1, 2018;37(19). pii: e99023. doi: 10.15252/embj.201899023. Epub Sep. 11, 2018.
Baboonian et al., Cross reaction of antibodies to a glycine/alanine repeat sequence of Epstein-Barr virus nuclear antigen-1 with collagen, cytokeratin, and actin. Ann Rheum Dis. Nov. 1991;50(11):772-5.
Bae et al., Antibody-aided clearance of extracellular α-synuclein prevents cell-to-cell aggregate transmission. J Neurosci. Sep. 26, 2012;32(39):13454-69.
Bañez-Coronel et al., A pathogenic mechanism in Huntington's disease involves small CAG-repeated RNAs with neurotoxic activity. PLoS Genet. 2012;8(2):e1002481. doi: 10.1371/journal.pgen.1002481. Epub Feb. 23, 2012.
Bañez-Coronel et al., RAN Translation in Huntington Disease. Neuron. Nov. 18, 2015;88(4):667-77. doi: 10.1016/j.neuron.2015.10.038.
Batra et al., Partners in crime: bidirectional transcription in unstable microsatellite disease. Hum Mol Genet. Apr. 15, 2010;19(R1):R77-82. doi: 10.1093/hmg/ddq132. Epub Apr. 4, 2010.
Carroll et al., Potent and selective antisense oligonucleotides targeting single-nucleotide polymorphisms in the Huntington disease gene / allele-specific silencing of mutant huntingtin. Mol Ther. Dec. 2011;19(12):2178-85. doi: 10.1038/mt.2011.201. Epub Oct. 4, 2011.
Chen et al., Functional genomics in *Drosophila* models of human disease. Briefings in Functional Genomics. Aug. 22, 2012;11(5):405-415.
Cleary et al., Repeat-associated non-ATG (RAN) translation in neurological disease. Hum Mol Genet. Oct. 15, 2013;22(R1):R45-51. doi: 10.1093/hmg/ddt371. Epub Aug. 4, 2013.
Donnelly et al., RNA toxicity from the ALS/FTD C9ORF72 expansion is mitigated by antisense intervention. Neuron. Oct. 16, 2013;80(2):415-28. doi: 10.1016/j.neuron.2013.10.015.
Duan et al., Generation of polyclonal antiserum for the detection of methylarginine proteins. J Immunol Methods. Mar. 30, 2007;320(1-2):132-42. Epub Feb. 6, 2007.

(56) References Cited

OTHER PUBLICATIONS

Duellman et al., Antigen-binding properties of monoclonal antibodies reactive with EBNA1 and use in immunoaffinity chromatography. PLoS One. 2009;4(2):e4614. doi: 10.1371/journal.pone. 0004614. Epub Feb. 26, 2009.

Gkogkas et al., Pharmacogenetic inhibition of eIF4E-dependent Mmp9 mRNA translation reverses fragile X syndrome-like phenotypes. Cell Rep. Dec. 11, 2014;9(5):1742-1755. doi: 10.1016/j. celrep.2014.10.064. Epub Nov. 26, 2014.

Gómez-Tortosa et al., C9ORF72 hexanucleotide expansions of 20-22 repeats are associated with frontotemporal deterioration. Neurology. Jan. 22, 2013;80(4):366-70. doi: 10.1212/WNL. 0b013e31827f08ea. Epub Jan. 2, 2013.

Hock et al., Antibodies against beta-amyloid slow cognitive decline in Alzheimer's disease. Neuron. May 22, 2003;38(4):547-54.

Jin et al., Metformin Protects Cells from Mutant Huntingtin Toxicity Through Activation of AMPK and Modulation of Mitochondrial Dynamics. Neuromolecular Med. Dec. 2016;18(4):581-592. doi: 10.1007/s12017-016-8412-z. Epub May 25, 2016. Author Manuscript, 19 pages.

Kearse et al., CGG Repeat-Associated Non-AUG Translation Utilizes a Cap-Dependent Scanning Mechanism of Initiation to Produce Toxic Proteins. Mol Cell. Apr. 21, 2016;62(2):314-322. doi: 10.1016/j.molcel.2016.02.034. Epub Mar. 31, 2016.

Leitman et al., ER stress-induced eIF2-alpha phosphorylation underlies sensitivity of striatal neurons to pathogenic huntingtin. PLoS One. Mar. 3, 2014;9(3):e90803. doi: 10.1371/journal.pone. 0090803.

Ma et al., Metformin therapy in a transgenic mouse model of Huntington's disease. Neurosci Lett. Jan. 10, 2007;411(2):98-103. doi: 10.1016/j.neulet.2006.10.039. Epub Nov. 15, 2006.

Mirkin, Expandable DNA repeats and human disease. Nature. Jun. 21, 2007;447(7147):932-40. doi: 10.1038/nature05977.

Mori et al., The C9orf72 GGGGCC repeat is translated into aggregating dipeptide-repeat proteins in FTLD/ALS. Science. Mar. 15, 2013;339(6125):1335-8. doi: 10.1126/science.1232927. Epub Feb. 7, 2013. Supplementary information included.

Satoh et al., Dystrophic neurites express C9orf72 in Alzheimer's disease brains. Alzheimers Res Ther. Aug. 16, 2012;4(4):33. doi: 10.1186/alzrt136. 13 pages.

Sha et al., Treatment implications of C9ORF72. Alzheimer's Res Ther. Nov. 27, 2012;4(6):46. doi: 10.1186/alzrt149. eCollection 2012.

Shoesmith et al., Amyotrophic lateral sclerosis: update for family physicians. Can Fam Physician. Dec. 2006;52(12):1563-9.

Trouth et al., Myasthenia gravis: a review. Autoimmune Dis.;2012:874680. doi: 10.1155/2012/874680. Epub Oct. 31, 2012.

Vaughn et al., Inhibition of PKR protects against tunicamycin-induced apoptosis in neuroblastoma cells. Gene. Feb. 15, 2014;536(1):90-6. doi: 10.1016/j.gene.2013.11.074. Epub Dec. 14, 2013.

Wang et al., Comparative Analysis of VOCs in Exhaled Breath of Amyotrophic Lateral Sclerosis and Cervical Spondylotic Myelopathy Patients. Sci Rep. 2016;6:26120. Published May 23, 2016. doi:10. 1038/srep26120.

Welnowska et al., Translation of viral mRNA without active eIF2: the case of picornaviruses. PLoS One. 2011;6(7):e22230. doi: 10.1371/journal.pone.0022230. Epub Jul. 14, 2011.

Wojciechowska et al., RAN translation and frameshifting as translational challenges at simple repeats of human neurodegenerative disorders. Nucleic Acids Res. Oct. 29, 2014;42(19):11849-64. doi: 10.1093/nar/gku794. Epub Sep. 12, 2014.

Xiao et al., Isoform-specific antibodies reveal distinct subcellular localizations of C9orf72 in amyotrophic lateral sclerosis. Ann Neurol. Oct. 2015;78(4):568-83. doi: 10.1002/ana.24469. Epub Aug. 29, 2015.

Yanagisawa et al., Protein Binding of a DRPLA Family Through Arginine-Glutamic Acid Dipeptide repeats is Enhanced by Extended polyglutamine. Human Molecular Genetics. 2000;9(9):1433-1442.

Yu et al., Developing therapeutic antibodies for neurodegenerative disease. Neurotherapeutics. Jul. 2013; 10(3):459-72. doi: 10.1007/s13311-013-0187-4.

Zhang et al., Aggregation-prone c9FTD/ALS poly(GA) RAN-translated proteins cause neurotoxicity by inducing ER stress. Acta Neuropathol. 2014; 128:505-24.

Zhou et al., Antibodies inhibit transmission and aggregation of C9orf72 poly-GA dipeptide repeat proteins. EMBO Mol Med. May 2017;9(5):687-702. doi: 10.15252/emmm.201607054.

Zu et al., RAN proteins and RNA foci from antisense transcripts in C9ORF72 ALS and frontotemporal dementia. Proc Natl Acad Sci U S A. Dec. 17, 2013;110(51):E4968-77. doi: 10.1073/pnas. 1315438110. Epub Nov. 18, 2013.

Extended European Search Report, mailed Oct. 4, 2023, in connection with application No. EP 20865149.7.

Extended European Search Report, mailed Aug. 25, 2023, in connection with Application No. EP 20869039.6.

Extended European Search Report, mailed Oct. 4, 2023, in connection with application No. EP 20874343.5.

Invitation to Pay Additional Fees, mailed Mar. 30, 2023, in connection with Application No. PCT/US2022/051530.

International Search Report and Written Opinion, mailed May 25, 2023, in connection with Application No. PCT/US2022/051530.

International Preliminary Report on Patentability, mailed Jun. 13, 2024, in connection with Application No. PCT/US2022/051530.

International Search Report and Written Opinion, mailed Jul. 19, 2023, in connection with Application No. PCT/US2023/063328.

International Preliminary Report on Patentability, mailed Sep. 12, 2024, in connection with Application No. PCT/US2023/063328.

[No Author Listed] CRC group Top> L. K. Housing> Query, after sampling and sampling, was conducted, kept still in whole blood ; CRC Corporation, Jun. 30, 2013. https://web.archive.org/web/20130630024235/http://www.crc-group.co.jp/crc/q_and_a/149. html.

Asokan et al., The AAV vector toolkit: poised at the clinical crossroads. Mol Ther. Apr. 2012;20(4):699-708. doi: 10.1038/mt. 2011.287. Epub Jan. 24, 2012.

Bando et al., Double-strand RNA dependent protein kinase (PKR) is involved in the extrastriatal degeneration in Parkinson's disease and Huntington's disease. Neurochem Int. Jan. 2005;46(1):11-8. doi: 10.1016/j.neuint.2004.07.005.

Bañez Coronel et al., Repeat-associated non-AUG (RAN) translation: insights from pathology. Lab Invest. Jul. 2019;99(7):929-942. doi: 10.1038/s41374-019-0241-x. Epub Mar. 27, 2019.

Bañez Coronel et al., Sense and antisense RAN proteins in the CAG•CTG polyglutamine spinocerebellar ataxias. International Congress for Ataxia Research. Abstract ID 271. Nov. 1-4, 2022. 1 page.

Barzilai et al., Metformin as a Tool to Target Aging. Cell Metab. Jun. 14, 2016;23(6):1060-1065. doi: 10.1016/j.cmet.2016.05.011.

Benkirane et al., Oncogenic potential of TAR RNA binding protein TRBP and its regulatory interaction with RNA-dependent protein kinase PKR. EMBO J. Feb. 3, 1997;16(3):611-24. doi: 10.1093/emboj/16.3.611.

Brooks et al., Spinal and bulbar muscular atrophy: a trinucleotide-repeat expansion neurodegenerative disease. Trends Neurosci. Oct. 1995; 18(10):459-61. doi: 10.1016/0166-2236(95)94497-s.

Castelli et al., Mechanisms of repeat-associated non-AUG translation in neurological microsatellite expansion disorders. Biochem Soc Trans. Apr. 30, 2021;49(2):775-792. doi: 10.1042/BST20200690.

Cendelin et al., Consensus Paper: Strengths and Weaknesses of Animal Models of Spinocerebellar Ataxias and Their Clinical Implications. Cerebellum. Jun. 2022;21(3):452-481. doi: 10.1007/s12311-021-01311-1. Epub Aug. 10, 2021.

Chen et al., Antidiabetic drug metformin (Glucophage$^R$) increases biogenesis of Alzheimer's amyloid peptides via up-regulating BACE1 transcription. Proc Natl Acad Sci U S A. Mar. 10, 2009;106(10):3907-12. doi: 10.1073/pnas.0807991106. Epub Feb. 23, 2009.

Cheng et al., C9ORF72 GGGGCC repeat-associated non-AUG translation is upregulated by stress through eIF2α phosphorylation. Nat Commun. Jan. 4, 2018;9(1):51. doi: 10.1038/s41467-017-02495-z.

(56) References Cited

OTHER PUBLICATIONS

Cleary et al., New developments in RAN translation: insights from multiple diseases. Curr Opin Genet Dev. Jun. 2017;44:125-134. doi: 10.1016/j.gde.2017.03.006. Epub Mar. 30, 2017. Author Manuscript, 18 pages.

Cleary et al., Repeat associated non-ATG (RAN) translation: new starts in microsatellite expansion disorders. Curr Opin Genet Dev. Jun. 2014;26:6-15. doi: 10.1016/j.gde.2014.03.002. Epub May 22, 2014. Author Manuscript, 20 pages.

Davidkin et al., Persistence of anti-mumps virus antibodies after a two-dose MMR vaccination. A nine-year follow-up. Vaccine. Nov. 1995;13(16):1617-22. doi: 10.1016/0264-410x(95)00064-8.

Foretz et al., Metformin: from mechanisms of action to therapies. Cell Metab. Dec. 2, 2014;20(6):953-66. doi: 10.1016/j.cmet.2014.09.018. Epub Oct. 30, 2014.

Gantois et al., Metformin ameliorates core deficits in a mouse model of fragile X syndrome. Nat Med. Jun. 2017;23(6):674-677. doi: 10.1038/nm.4335. Epub May 15, 2017.

Gendron et al., Cerebellar c9RAN proteins associate with clinical and neuropathological characteristics of C9ORF72 repeat expansion carriers. Acta Neuropathol. Oct. 2015;130(4):559-73. doi: 10.1007/s00401-015-1474-4. Epub Sep. 8, 2015.

Gendron et al., Poly(GP) proteins are a useful pharmacodynamic marker for C9ORF72-associated amyotrophic lateral sclerosis. Sci Transl Med. Mar. 29, 2017;9(383):eaai7866. doi: 10.1126/scitranslmed.aai7866.

Gray et al., Comparability of serum prostate-specific antigen measurement between the Roche Diagnostics Elecsys 2010 and the Abbott Architect i2000. Ann Clin Biochem. May 2004;41(Pt 3):207-12. doi: 10.1258/000456304323019578.

Green et al., RAN translation at C9orf72-associated repeat expansions is selectively enhanced by the integrated stress response. Nat Commun. Dec. 8, 2017;8(1):2005. doi: 10.1038/s41467-017-02200-0.

Guerra et al., Human gene profiling in response to the active protein kinase, interferon- induced serine/threonine protein kinase (PKR), in infected cells. Involvement of the transcription factor ATF-3 in PKR-induced apoptosis. J Biol Chem. Jul. 7, 2006;281(27):18734-45. doi: 10.1074/jbc.M511983200. Epub Apr. 13, 2006.

Jawaid et al., ALS disease onset may occur later in patients with pre-morbid diabetes mellitus. Eur J Neurol. May 2010;17(5):733-9. doi: 10.1111/j.1468-1331.2009.02923.x. Epub Jan. 13, 2010.

Kioumourtzoglou et al., Diabetes Mellitus, Obesity, and Diagnosis of Amyotrophic Lateral Sclerosis: A Population-Based Study. JAMA Neurol. Aug. 2015;72(8):905-11. doi: 10.1001/jamaneurol.2015.0910. Author Manuscript, 15 pages.

Koide et al., Unstable expansion of CAG repeat in hereditary dentatorubral-pallidoluysian atrophy (DRPLA). Nat Genet. Jan. 1994;6(1):9-13. doi: 10.1038/ng0194-9.

Koob et al., An untranslated CTG expansion causes a novel form of spinocerebellar ataxia (SCA8). Nat Genet. Apr. 1999;21(4):379-84. doi: 10.1038/7710.

Liu et al., C9orf72 BAC Mouse Model with Motor Deficits and Neurodegenerative Features of ALS/FTD. Neuron. May 4, 2016;90(3):521-34. doi: 10.1016/j.neuron.2016.04.005. Epub Apr. 21, 2016.

Memmott et al., Metformin prevents tobacco carcinogen—induced lung tumorigenesis. Cancer Prev Res (Phila). Sep. 2010;3(9):1066-76. doi: 10.1158/1940-6207.CAPR-10-0055. Epub Sep. 1, 2010.

Moon et al., Neuronal Regulation of eIF2α Function in Health and Neurological Disorders. Trends Mol Med. Jun. 2018;24(6):575-589. doi: 10.1016/j.molmed.2018.04.001. Epub Apr. 30, 2018.

Nguyen et al., Repeat-Associated Non-ATG Translation: Molecular Mechanisms and Contribution to Neurological Disease. Annu Rev Neurosci. Jul. 8, 2019;42:227-247. doi: 10.1146/annurev-neuro-070918-050405. Epub Mar. 25, 2019. Author Manuscript, 24 pages.

Pakos-Zebrucka et al., The integrated stress response. EMBO Rep. Oct. 2016;17(10):1374-1395. doi: 10.15252/embr.201642195. Epub Sep. 14, 2016.

Park et al., TAR RNA-binding protein is an inhibitor of the interferon-induced protein kinase PKR. Proc Natl Acad Sci U S A. May 24, 1994;91(11):4713-7. doi: 10.1073/pnas.91.11.4713.

Peel et al., Double-stranded RNA-dependent protein kinase, PKR, binds preferentially to Huntington's disease (HD) transcripts and is activated in HD tissue. Hum Mol Genet. Jul. 15, 2001;10(15):1531-8. doi: 10.1093/hmg/10.15.1531.

Perez et al., CCG•CGG interruptions in high-penetrance SCA8 families increase RAN translation and protein toxicity. EMBO Mol Med. Nov. 8, 2021;13(11):e14095. doi: 10.15252/emmm.202114095. Epub Oct. 11, 2021.

Sonenberg et al., Regulation of translation initiation in eukaryotes: mechanisms and biological targets. Cell. Feb. 20, 2009;136(4):731-45. doi: 10.1016/j.cell.2009.01.042.

Soragni et al., Repeat-Associated Non-ATG (RAN) Translation in Fuchs' Endothelial Corneal Dystrophy. Invest Ophthalmol Vis Sci. Apr. 1, 2018;59(5):1888-1896. doi: 10.1167/iovs.17-23265.

Tandon et al., Polyglutamine disorders: Pathogenesis and potential drug interventions. Life Sci. May 1, 2024;344:122562. doi: 10.1016/j.lfs.2024.122562. Epub Mar. 14, 2024.

Taylor et al., Decoding ALS: from genes to mechanism. Nature. Nov. 10, 2016;539(7628):197-206. doi: 10.1038/nature20413. Author Manuscript, 28 pages.

Tian et al., Expanded CUG repeat RNAs form hairpins that activate the double-stranded RNA-dependent protein kinase PKR. RNA. Jan. 2000;6(1):79-87. doi: 10.1017/s1355838200991544.

Todd et al., CGG repeat-associated translation mediates neurodegeneration in fragile X tremor ataxia syndrome. Neuron. May 8, 2013;78(3):440-55. doi: 10.1016/j.neuron.2013.03.026. Epub Apr. 18, 2013. Erratum in: Neuron. Jul. 24, 2013;79(2):402.

Todd et al., Insights into the pathogenic mechanisms of Chromosome 9 open reading frame 72 (C9orf72) repeat expansions. J Neurochem. Aug. 2016;138 Suppl 1:145-62. doi: 10.1111/jnc.13623. Epub Jun. 15, 2016.

Tsuji, S., Dentatorubral-pallidoluysian atrophy. Handb Clin Neurol. 2012; 103:587-94. doi: 10.1016/B978-0-444-51892-7.00041-3.

Vishwakarma et al., Current molecular insight to reveal the dynamics of CAG repeating units in spinocerebellar ataxia. Intractable Rare Dis Res. May 2018;7(2):79-86. doi: 10.5582/irdr.2018.01039.

Wieben et al., Amplification-free long-read sequencing of TCF4 expanded trinucleotide repeats in Fuchs Endothelial Corneal Dystrophy. PLoS One. Jul. 5, 2019;14(7):e0219446. doi: 10.1371/journal.pone.0219446.

William et al., Old friends on new paths: metformin as an early phase treatment in Huntington's Disease?, Medizinische Genetik, 28, pp. 215-216, Mar. 4, 2016 (Mar. 4, 2016) (Abstract).

Zhu et al., Suppression of PKR promotes network excitability and enhanced cognition by interferon-γ-mediated disinhibition. Cell. Dec. 9, 2011;147(6):1384-96. doi: 10.1016/j.cell.2011.11.029.

Zu et al., Metformin inhibits RAN translation through PKR pathway and mitigates disease in C9orf72 ALS/FTD mice. Proc Natl Acad Sci U S A. Aug. 4, 2020;117(31):18591-18599. doi: 10.1073/pnas.2005748117. Epub Jul. 20, 2020. Supplementary Materials, 33 pages.

Zu et al., Non-ATG-initiated translation directed by microsatellite expansions. Proc Natl Acad Sci U S A. Jan. 4, 2011;108(1):260-5. doi: 10.1073/pnas.1013343108. Epub Dec. 20, 2010.

Zu et al., RAN Translation Regulated by Muscleblind Proteins in Myotonic Dystrophy Type 2. Neuron. Sep. 13, 2017;95(6):1292-1305.e5. doi: 10.1016/j.neuron.2017.08.039.

\* cited by examiner

DETECTION OF ANTIBODIES AGAINST RAN PROTEINS FROM SERUM AND TISSUE LYSATES

RELATED APPLICATIONS

This application is a national stage filing under 35 U.S.C. § 371 of International Patent Application No. PCT/US2020/051671, filed Sep. 18, 2020, which claims the benefit under 35 U.S.C. § 119(e) of the filing date of U.S. provisional Application Ser. No. 62/903,689, filed Sep. 20, 2019, entitled "DETECTION OF ANTIBODIES AGAINST RAN PROTEINS FROM SERUM AND TISSUE LYSATES", and 62/904,612, filed Sep. 23, 2019, entitled "VACCINE THERAPY FOR RAN PROTEIN DISEASES," the entire contents of each of which are incorporated herein by reference in their entirety.

FEDERALLY SPONSORED RESEARCH

This invention was made with government support under Grant No. R01 NS098819 awarded by the National Institutes of Health. The government has certain rights in the invention.

REFERENCE TO A SEQUENCE LISTING SUBMITTED AS A TEXT FILE VIA EFS-WEB

This application contains a Sequence Listing which has been submitted in ASCII format via EFS-Web and is hereby incorporated by reference in its entirety. Said ASCII copy, created on Feb. 14, 2022, is named U120270070US01-SEQ-KSB and is 8452 bytes in size.

BACKGROUND

Microsatellite repeat expansions are known to cause more than forty neurodegenerative diseases and disorders. In a growing number of these diseases and disorders, expansion mutations have been shown to undergo a novel type of protein translation that occurs in multiple reading frames and does not require a canonical AUG initiation codon. This type of translation is called repeat associated non-ATG (RAN) translation and the proteins that are produced are called RAN proteins. There is growing evidence that RAN proteins are toxic and contribute to a growing number of diseases and disorders including, but not limited to, amyotrophic lateral sclerosis (ALS), frontotemporal dementia (FTD), myotonic dystrophy type 1 (DM1), myotonic dystrophy type 2 (DM2), Huntington's disease (HD), Alzheimer's disease (AD), and Fragile X Tremor Ataxia Syndrome (FXTAS).

SUMMARY

Aspects of the disclosure relate to methods and kits for detecting anti-RAN protein antibodies in a sample. The antibodies detected by methods described herein can be exogenously-administered antibodies (e.g., an antibody therapeutically administered to the subject) or an endogenous antibody (e.g., an antibody produced by the cells of the subject). In some embodiments, an endogenous antibody is an autoantibody. In some embodiments, an endogenous antibody is produced by cells of the subject that are infected with an expression vector encoding the antibody. In some embodiments, an endogenous antibody is produced by the cells of the subject in response to being administered a vaccine. In some embodiments, an endogenous antibody is produced by the cells of the subject in response to the subject having an expansion mutation that expresses one or more types of RAN proteins (e.g., a subject having C9Orf72 ALS/FTD may produce antibodies, such as autoantibodies, to poly(GA), poly(GP), poly(GR), poly(PA), or poly(PR) proteins).

In some embodiments, methods of detecting RAN protein antibodies described herein are useful for the diagnosis and treatment of certain neurological diseases and disorders associated with repeat associated non-ATG (RAN) proteins, including, for example, polySerine [polySer], poly(Proline-Arginine) [poly(PR)], and poly(Glycine-Arginine) [poly(GR)], etc. Mutations of certain repeat expansions (e.g., CAGG, CCTG, GGGGCC, GGCCCC, GGGGCA, CAG, CTG, etc.) are associated with a number of different neurological diseases and disorders, such as amyotrophic lateral sclerosis (ALS); frontotemporal dementia (FTD); myotonic dystrophy type 1 (DM1); myotonic dystrophy type 2 (DM2); spinocerebellar ataxia (SCA) types 1, 2, 3, 6, 7, 8, 10, 12, 17, 31, and 36; spinal bulbar muscular atrophy; dentatorubral-pallidoluysian atrophy (DRPLA); Huntington's disease (HD); and Alzheimer's disease (AD).

In some embodiments, expansion mutations associated with certain diseases (e.g., ALS, FTD, FXTAS, HD, AD, SCAB, DM1, and DM2), have been observed to undergo repeat-associated non-ATG (RAN) translation. This type of translation produces proteins called RAN proteins. There is growing evidence that RAN proteins are toxic and contribute to a growing number of diseases and disorders. It therefore is important to develop methods and kits for detecting, localizing, and identifying anti-RAN protein antibodies (e.g., potentially protective anti-RAN protein antibodies) in a sample for both therapeutic and diagnostic uses.

In some embodiments, an immunoassay (e.g., an electrochemiluminescence-based immunoassay) is used to detect or measure levels of one or more anti-RAN protein antibodies in a biological sample (e.g., a blood, serum, or cerebrospinal fluid (CSF) sample) obtained from a subject.

The disclosure is based, in part, on immunoassays that are capable of measuring levels of one or more anti-RAN protein antibodies (also referred to as anti-RAN antibodies) from cells or tissues of subjects with higher sensitivity as compared to previously used detection methods. In some embodiments, a subject has or is suspected of having a RAN protein-associated disease or disorder. In some embodiments, the subjects have been administered therapeutic agents for treatment of a RAN protein-associated disease or disorder. In some aspects, methods described by the disclosure are useful for monitoring (e.g., longitudinally measuring) levels of one or more anti-RAN protein antibodies in a subject who has been or is being administered one or more therapeutic agents for treatment of a disease or disorder associated with RAN protein expression, such as ALS or FTD.

In some aspects, the disclosure relates to a method for detecting one or more anti-RAN protein antibodies using an electrochemiluminescence-based immunoassay, wherein the method comprises (1) contacting a target di-amino acid peptide repeat with a biological sample obtained from a subject to form an anti-RAN antibody-target peptide complex; (2) contacting the anti-RAN antibody-target peptide complex with an electrochemiluminescent detection agent to form a labeled complex; and (3) measuring a level of one or more anti-RAN protein antibodies present in the sample by detecting electrochemiluminescence of the labeled complex.

In some embodiments, a biological sample is a blood sample, serum sample, or a tissue sample. In some embodiments, a tissue sample is a CNS tissue sample or a cerebrospinal fluid (CSF) sample. In some embodiments, the biological sample is diluted. In some embodiments, the biological sample is diluted prior to the detection of one or more anti-RAN protein antibodies. In some embodiments, the biological sample is diluted with a diluting agent. In some embodiments, the diluting agent is Phosphate-Buffered Saline (PBS) or Tris-Buffered Saline (TBST). In some embodiments, the biological sample is diluted such that the ratio of biological sample to diluting agent is 1:2, 1:3, 1:4, 1:5, 1:6, 1:7, 1:8, 1:9, 1:10, 1:15, 1:20, 1:25, 1:30, 1:35, 1:40, 1:45, 1:50, 1:60, 1:70, 1:80, 1:90, 1:100, 1:150, 1:200, 1:250, 1:300, 1:350, 1:400, 1:450, 1:500, 1:600, 1:700, 1:800, 1:900, 1:1000, 1:1250, 1:1500, 1:1750, or 1:2000, or any ratio contained therein. In some embodiments, the biological sample is diluted such that the percentage of biological sample present in the diluted sample is 0.0001, 0.0002, 0.0003, 0.0004, 0.0005, 0.0006, 0.0007, 0.0008, 0.0009, 0.001, 0.002, 0.003, 0.004, 0.005, 0.006, 0.007, 0.008, 0.009, 0.01, 0.011, 0.012, 0.013, 0.014, 0.015, 0.016, 0.107, 0.018, 0.019, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or more than 99%, or any value contained therein.

In some embodiments, a subject is a mammalian subject. In some embodiments, a subject is a human or a mouse. In some embodiments, a subject is a C9-BAC mouse.

In some embodiments, the anti-RAN antibody-target peptide complex comprises an antibody comprising any one of an anti-poly(CP), anti-poly(GA), anti-poly(GP), anti-poly(PR), anti-poly(GR), anti-poly(PA), anti-poly(A), anti-poly(G), anti-poly(S); anti-poly(C); anti-poly(Q); anti-poly(GD), anti-poly(GE), anti-poly(GQ), anti-poly(GT), anti-poly(L), anti-poly(LP), anti-poly(LPAC (SEQ ID NO: 1)), anti-poly(LS), anti-poly(P), anti-poly(QAGR (SEQ ID NO: 2)), anti-poly(RE), anti-poly(SP), anti-poly(VP), anti-poly(FP), or anti-poly(GK) antibody, and a target peptide comprising any one of a poly(CP), poly(GA), poly(GP), poly(PR), poly(GR), poly(PA), poly(A), poly(G), poly(S), poly(C), poly(Q), poly(GD), poly(GE), poly(GQ), poly(GT), poly(L), poly(LP), poly(LPAC (SEQ ID NO: 1)), poly(LS), poly(P), poly(QAGR (SEQ ID NO: 2)), poly(RE), poly(SP), poly(VP), poly(FP), or poly(GK) peptide. In some embodiments, the one or more anti-RAN protein antibodies present in the sample comprise one or more of an anti-poly(CP), anti-poly(GA), anti-poly(GP), anti-poly(PR), anti-poly(GR), anti-poly(PA), anti-poly(A), anti-poly(G), anti-poly(S); anti-poly(C); anti-poly(Q); anti-poly(GD), anti-poly(GE), anti-poly(GQ), anti-poly(GT), anti-poly(L), anti-poly(LP), anti-poly(LPAC (SEQ ID NO: 1)), anti-poly(LS), anti-poly(P), anti-poly(QAGR (SEQ ID NO: 2)), anti-poly(RE), anti-poly(SP), anti-poly(VP), anti-poly(FP), or anti-poly(GK) antibody.

In some embodiments, a subject has been administered a therapeutic anti-RAN antibody. In some embodiments, a therapeutic anti-RAN antibody is an anti-poly(Cysteine-Proline) [anti-poly(CP)]; anti-poly(Glycine-Proline) [anti-poly(GP)]; anti-poly(Glycine-Arginine) [anti-poly(GR)]; anti-poly(Glycine) [anti-poly(G)]; anti-poly(Alanine) [anti-poly(A)]; anti-poly(Serine) [anti-poly(S)]; anti-poly(Cysteine) [anti-poly(C)]; anti-poly(Glutamine) [anti-poly(Q)]; anti-poly(Glycine-Alanine) [anti-poly(GA)]; anti-poly(Glycine-Aspartate) [anti-poly(GD)]; anti-poly(Glycine-Glutamate) [anti-poly(GE)]; anti-poly(Glycine-Glutamine) [anti-poly(GQ)]; anti-poly(Glycine-Threonine) [anti-poly(GT)]; anti-poly(Leucine) [anti-polyLeu]; anti-poly(Leucine-Proline) [anti-poly(LP)]; anti-poly(Leucine-Proline-Alanine-Cysteine (SEQ ID NO: 1)) [anti-poly(LPAC (SEQ ID NO: 1))]; anti-poly(Leucine-Serine) [anti-poly(LS)]; anti-poly(Proline) [anti-poly(P)]; anti-poly(Proline-Alanine) [anti-poly(PA)]; anti-poly(Proline-Arginine) [anti-poly(PR)]; anti-poly(Glutamine-Alanine-Glycine-Arginine (SEQ ID NO: 2)) [anti-poly(QAGR (SEQ ID NO: 2))]; anti-poly(Arginine-Glutamate) [anti-poly(RE)]; anti-poly(Serine-Proline) [anti-poly(SP)]; anti-poly(Valine-Proline) [anti-poly(VP)]; anti-poly(phenylalanine-proline) [anti-poly(FP)]; or anti-poly(glycine-lysine) [anti-poly(GK)] antibody, or any combination thereof.

In some embodiments, a subject has been administered a vaccine against a RAN protein-associated disease or disorder (e.g., administered the vaccine prior to the sample being obtained). In some embodiments, a vaccine elicits an immune response to one or more di-peptide repeat proteins. In some embodiments, the immune response comprises the endogenous production of anti-RAN protein antibodies. In some embodiments, the endogenous antibodies comprise one or more of an anti-poly(CP), anti-poly(GA), anti-poly(GP), anti-poly(PR), anti-poly(GR), anti-poly(PA), anti-poly(A), anti-poly(G), anti-poly(S); anti-poly(C); anti-poly(Q); anti-poly(GD), anti-poly(GE), anti-poly(GQ), anti-poly(GT), anti-poly(L), anti-poly(LP), anti-poly(LPAC (SEQ ID NO: 1)), anti-poly(LS), anti-poly(P), anti-poly(QAGR (SEQ ID NO: 2)), anti-poly(RE), anti-poly(SP), anti-poly(VP), anti-poly(FP), or anti-poly(GK) antibody, or any combination thereof.

In some embodiments, the vaccine comprises one or more peptide antigens. In some embodiments, the one or more peptide antigens comprise one or more immunogens. In some embodiments, the one or more peptide antigens comprise 1, 2, 3, 4, 5, 6, 7, 8, 9, or 10 immunogens. In some embodiments, the one or more peptide antigens target one or more RAN proteins, optionally wherein the one or more RAN proteins are one or more of: poly(CP), poly(GA), poly(GP), poly(PR), poly(GR), poly(PA), poly(A), poly(G), poly(S), poly(C), poly(Q), poly(GD), poly(GE), poly(GQ), poly(GT), poly(L), poly(LP), poly(LPAC (SEQ ID NO: 1)), poly(LS), poly(P), poly(QAGR (SEQ ID NO: 2)), poly(RE), poly(SP), poly(VP), poly(FP), and/or poly(GK) RAN proteins.

In some embodiments, the one or more peptide antigens comprise one or more di-peptide repeat (DPR) peptide antigens, optionally wherein the one or more di-peptide repeat (DPR) peptide antigens comprise one or more of $(CP)_x$ (SEQ ID NO:3), $(A)_x$ (SEQ ID NO:9), $(G)_x$ (SEQ ID NO:10), $(S)_x$ (SEQ ID NO: 11), $(C)_x$ (SEQ ID NO: 12), $(Q)_x$ (SEQ ID NO: 13), $(GD)_x$ (SEQ ID NO: 14), $(GE)_x$ (SEQ ID NO: 15), $(GQ)_x$ (SEQ ID NO:16), $(GT)_x$ (SEQ ID NO:17), $(L)_x$ (SEQ ID NO: 18), $(LP)_x$ (SEQ ID NO: 19), $(LPAC)_x$ (SEQ ID NO: 20), $(LS)_x$ (SEQ ID NO: 21), $(P)_x$ (SEQ ID NO: 22), $(QAGR)_x$ (SEQ ID NO: 23), $(RE)_x$ (SEQ ID NO: 24), $(SP)_x$ (SEQ ID NO: 25), $(VP)_x$ (SEQ ID NO: 26), $(FP)_x$ (SEQ ID NO: 27), and/or $(GK)_x$ (SEQ ID NO: 28) di-amino acid repeats, wherein x represents the number of repeat units of the antigen. In some embodiments, x is 5, 10, 15, 20, 25, 30, 35, or 40.

In some embodiments, the one or more peptide antigens comprise one or more of ($GA_{10}$ (SEQ ID NO: 4), $GA_{15}$ (SEQ ID NO: 4), $GR_{25}$ (SEQ ID NO: 7), $GP_{10}$ (SEQ ID NO: 5), $PR_{10}$ (SEQ ID NO: 6), or a combination thereof. In some embodiments, the one or more peptide antigens comprise $[(GA)_{15}$ (SEQ ID NO: 4)+$(GR)_{25}$ (SEQ ID NO: 7)±$(PR)_{10}$ (SEQ ID NO: 6)]. In some embodiments, the one or more peptide antigens comprise $[(GA)_{15}$ (SEQ ID NO: 4)+$(GR)_{25}$ (SEQ ID NO: 7)+$(PR)_{10}$ (SEQ ID NO: 6)+$(GP)_{10}$ (SEQ ID NO: 5)]. In some embodiments, the one or more peptide antigens comprise a B-cell epitope.

In some embodiments, the one or more immunogens comprise one or more of keyhole limpet hemocyanin (KLH), Blue Carrier Immunogenic protein (CCH), bovine serum albumin (BSA), ovalbumin (OVA), diphtheria toxin, measles virus fusion protein (MVF), hepatitis B virus surface antigen (HB-sAg), tetanus toxin (TT), pertussis toxin (PT), or a T cell helper epitope.

In some embodiments, a RAN protein-associated disease is amyotrophic lateral sclerosis (ALS), frontotemporal dementia (FTD), Alzheimer's disease (AD), or Huntington's disease (HD).

In some embodiments, a target peptide comprises one or more of di-peptide, tri-peptide, tetra-peptide, penta-peptide, or homopolymeric repeat proteins. In some embodiments, the one or more di-peptide repeat proteins is: poly(CP), poly(GA), poly(GP), poly(PR), poly(GR), poly(PA), poly(A), poly(G), poly(S), poly(C), poly(Q), poly(GD), poly(GE), poly(GQ), poly(GT), poly(L), poly(LP), poly(LPAC (SEQ ID NO: 1)), poly(LS), poly(P), poly(QAGR (SEQ ID NO: 2)), poly(RE), poly(SP), poly(VP), poly(FP), poly(GK), or any combination thereof. In some embodiments, the target amino acid repeat region of the one or more RAN proteins comprises at least 20, at least 25, at least 30, at least 40, at least 50, at least 60, at least 70, at least 80, at least 90, at least 100, at least 200, at least 300, at least 400, at least 500, at least 1000, at least 1500, at least 2000, at least 3000, at least 4000, at least 5000, at least 10000, or more than 10000 amino acid residues. In some embodiments, the target amino acid repeat region of the one or more RAN proteins comprises more than 200 amino acid residues (e.g., 500, 1000, 5000, 10000, or more than 10000, etc.). In some embodiments, the target amino acid repeat region of the one or more RAN proteins is between 10 and 15,000 amino acids in length. In some embodiments, the target amino acid repeat region of the one or more RAN proteins is between 50 and 12,000 amino acids in length. In some embodiments, the target amino acid repeat region of the one or more RAN proteins is between 100 and 10,000 amino acids in length. In some embodiments, the target amino acid repeat region of the one or more RAN proteins is between 150 and 8,000 amino acids in length. In some embodiments, the target amino acid repeat region of the one or more RAN proteins is between 200 and 5,000 amino acids in length. In some embodiments, the target amino acid repeat region of the one or more RAN proteins is between 300 and 2,000 amino acids in length. In some embodiments, the target amino acid repeat region of the one or more RAN proteins is between 400 and 1,000 amino acids in length. In some embodiments, the target amino acid repeat region of the one or more RAN proteins is between 500 and 750 amino acids in length. In some embodiments, a RAN protein has a poly-amino acid repeat that is between 10 and 500 amino acid residues in length. In some embodiments, a RAN protein has a poly-amino acid repeat that is between 20 and 300 amino acid residues in length. In some embodiments, a RAN protein has a poly-amino acid repeat that is between 30 and 200 amino acid residues in length. In some embodiments, a RAN protein has a poly-amino acid repeat that is between 40 and 100 amino acid residues in length. In some embodiments, a RAN protein has a poly-amino acid repeat that is between 50 and 90 amino acid residues in length. In some embodiments, a RAN protein has a poly-amino acid repeat that is between 60 and 80 amino acid residues in length.

In some embodiments, an electrochemiluminescent detection agent comprises Ruthenium (II) tris-bipyridine-(4-methylsulfone). In some embodiments, an electrochemiluminescent detection agent is a SULFO-TAG™.

In some embodiments, electrochemiluminescence of a labeled complex is measured by a Meso Scale Detection (MSD) assay.

In some embodiments, methods described herein further comprise a step of administering a second therapeutic agent (e.g., one or more antisense oligonucleotides, a vaccine, exogenously administered anti-RAN antibodies, other therapeutic agents, or a combination of two or more thereof) to the subject for the treatment of the RAN protein-associated neurological disease or disorder. In some embodiments, the second therapeutic agent is a small molecule, nucleic acid, interfering RNA, protein, peptide, antibody, vaccine, gene therapy vector, or other immunogen. In some embodiments, a second biological sample is obtained from the subject after administration of the second therapeutic agent, and one or more anti-RAN protein antibodies is detected in the second biological sample using an electrochemiluminescence-based immunoassay.

In some embodiments, one or more anti-RAN protein antibodies is an anti-poly(CP), anti-poly(GA), anti-poly(GP), anti-poly(PR), anti-poly(GR), anti-poly(PA), anti-poly(A), anti-poly(G), anti-poly(S); anti-poly(C); anti-poly(Q); anti-poly(GD), anti-poly(GE), anti-poly(GQ), anti-poly(GT), anti-poly(L), anti-poly(LP), anti-poly(LPAC (SEQ ID NO: 1)), anti-poly(LS), anti-poly(P), anti-poly(QAGR (SEQ ID NO: 2)), anti-poly(RE), anti-poly(SP), anti-poly(VP), anti-poly(FP), or anti-poly(GK) antibody, or any combination thereof.

In some aspects, the disclosure relates to a method for measuring pharmacokinetic changes in anti-RAN protein antibody levels in a subject, the method comprising: (1) detecting in a first biological sample obtained from a subject one or more anti-RAN protein antibodies using an electrochemiluminescence-based immunoassay; (2) detecting in a second biological sample obtained from the subject one or more anti-RAN protein antibodies using an electrochemiluminescence-based immunoassay, wherein the second biological sample is obtained after administration of a therapeutic agent to the subject; and (3) determining that administration of the therapeutic agent to the subject results in a change in one or more anti-RAN protein antibody levels in the subject if the amount of anti-RAN protein antibodies detected in the first biological sample is different than the amount of anti-RAN protein antibodies detected in the second biological sample. In some embodiments, the second biological sample contains an elevated level of anti-RAN protein antibodies relative to the first biological sample. In some embodiments, the second biological sample contains a decreased level of anti-RAN protein antibodies relative to the first biological sample.

In some embodiments, the first biological sample is a control sample. In some embodiments, the control sample is a biological sample obtained from a healthy subject. In some embodiments, the control sample is a biological sample obtained from the same subject at an earlier point in time.

In some embodiments, a first biological sample and/or the second biological sample is a blood sample, serum sample, or a tissue sample. In some embodiments, a tissue sample is a CNS tissue or cerebrospinal fluid (CSF) sample.

In some embodiments, one or more anti-RAN protein antibodies is an anti-poly(CP), anti-poly(GA), anti-poly(GP), anti-poly(PR), anti-poly(GR), anti-poly(PA), anti-poly(A), anti-poly(G), anti-poly(S), anti-poly(C), anti-poly(Q), anti-poly(GD), anti-poly(GE), anti-poly(GQ), anti-poly(GT), anti-poly(L), anti-poly(LP), anti-poly(LPAC (SEQ ID NO: 1)), anti-poly(LS), anti-poly(P), anti-poly(QAGR (SEQ ID NO: 2)), anti-poly(RE), anti-poly(SP), anti-poly(VP), anti-poly(FP), or anti-poly(GK) antibody, or any combination thereof.

In some embodiments, the disclosure relates to a kit comprising: one or more target di-amino acid repeat peptides; and an immunoassay plate and/or immunoassay reagents. In some embodiments, one or more target di-amino acid repeat peptides are selected from: poly(CP), poly(GA), poly(GP), poly(PR), poly(GR), poly(PA), poly(A), poly(G), poly(S), poly(C), poly(Q), poly(GD), poly(GE), poly(GQ), poly(GT), poly(L), poly(LP), poly(LPAC (SEQ ID NO: 1)), poly(LS), poly(P), poly(QAGR (SEQ ID NO: 2)), poly(RE), poly(SP), poly(VP), poly(FP), and poly(GK) peptides. In some embodiments, an immunoassay plate, and/or immunoassay reagents are a MSD assay plate and/or MSD assay reagents.

DETAILED DESCRIPTION

Figure 1:
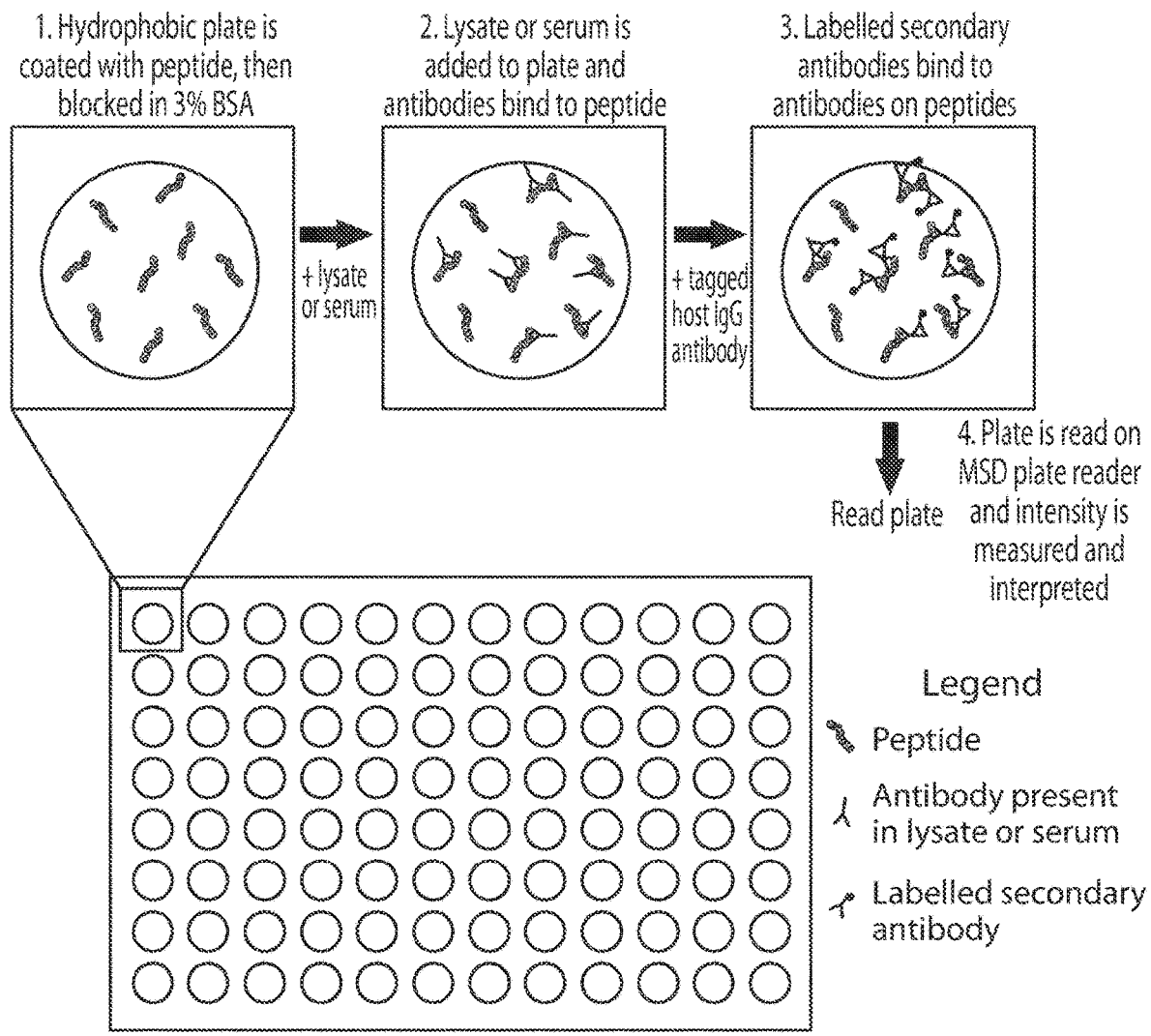
FIG. 1 shows a schematic depicting one embodiment of an assay for detection of RAN proteins in a biological sample.

Aspects of the disclosure relate to methods and compositions useful for detecting antibodies that bind to repeat-associated non-ATG proteins (RAN proteins) in a biological sample obtained from a subject. The antibodies detected by methods described herein can be exogenously-administered antibodies (e.g., an antibody therapeutically administered to the subject) or an endogenous antibody (e.g., an antibody produced by the cells of the subject). In some embodiments, an endogenous antibody is an autoantibody. In some embodiments, an endogenous antibody is produced by cells of the subject that are infected with an expression vector encoding the antibody. In some embodiments, an endogenous antibody is produced by the cells of the subject in response to being administered a vaccine. In some embodiments, an endogenous antibody is produced by the cells of the subject in response to the subject having an expansion mutation that expresses one or more types of RAN proteins (e.g., a subject having C9Orf72 ALS/FTD may produce antibodies, such as autoantibodies, to poly(GA), poly(GP), poly(GR), poly(PA), or poly(PR) proteins).

In some embodiments, methods of detecting RAN protein antibodies described herein are useful for the diagnosis and treatment of certain neurological diseases and disorders associated with repeat associated non-ATG (RAN) proteins, including, for example, polySerine [polySer], poly(Proline-Arginine) [poly(PR)], and poly(Glycine-Arginine) [poly(GR)] RAN proteins, etc. Mutations of certain repeat expansions (e.g., CAGG, CCTG, GGGGCC, GGCCCC, GGGGCA, CAG, and CTG) are associated with a number of different neurological diseases and disorders (e.g., amyotrophic lateral sclerosis (ALS), or frontotemporal dementia; myotonic dystrophy type 1 (DM1) and myotonic dystrophy type 2 (DM2); spinocerebellar ataxia types 1, 2, 3, 6, 7, 8, 10, 12, 17, 31, and 36; spinal bulbar muscular atrophy; dentatorubral-pallidoluysian atrophy (DRPLA); Huntington's disease (HD); and Alzheimer's disease (AD).

The disclosure is based, in part, on longitudinal detection (e.g., detection over a defined time course) of one or more anti-RAN protein antibody levels in a biological sample using electrochemiluminescence-based immunoassays. In some embodiments, methods described by the disclosure are useful for indicating the effectiveness of therapeutic agents which inhibit RAN protein expression, accumulation, and/or translation, for example by indicating an increase in concentration or production of anti-RAN protein antibody levels after administration of one or more therapeutic agents to a subject.

RAN Proteins

A "RAN protein (repeat-associated non-ATG translated protein)" is a polypeptide translated from mRNA sequence carrying a nucleotidic expansion in the absence of an AUG initiation codon. Generally, RAN proteins comprise expansion repeats of a single amino acid, di-amino acid, tri-amino acid, or quad-amino acid (e.g., tetra-amino acid), termed poly-amino acid repeats. RAN proteins can have a poly-amino acid repeat of at least 20, at least 25, at least 30, at least 40, at least 50, at least 60, at least 70, at least 80, at least 90, at least 100, at least 200, at least 300, at least 400, at least 500, at least 1000, at least 1500, at least 2000, at least 3000, at least 4000, at least 5000, at least 10000, or more than 10000 amino acid residues. In some embodiments, a RAN protein has a poly-amino acid repeat more than 200 amino acid residues (e.g., 500, 1000, 5000, 10,000, or more than 10,000, etc.) in length. In some embodiments, the target amino acid repeat region of the one or more RAN proteins is between 10 and 15,000 amino acids in length. In some embodiments, the target amino acid repeat region of the one or more RAN proteins is between 50 and 12,000 amino acids in length. In some embodiments, the target amino acid repeat region of the one or more RAN proteins is between 100 and 10,000 amino acids in length. In some embodiments, the target amino acid repeat region of the one or more RAN proteins is between 150 and 8,000 amino acids in length. In some embodiments, the target amino acid repeat region of the one or more RAN proteins is between 200 and 5,000 amino acids in length. In some embodiments, the target amino acid repeat region of the one or more RAN proteins is between 300 and 2,000 amino acids in length. In some embodiments, the target amino acid repeat region of the one or more RAN proteins is between 400 and 1,000 amino acids in length. In some embodiments, the target amino acid repeat region of the one or more RAN proteins is between 500 and 750 amino acids in length. In some embodiments, a RAN protein has a poly-amino acid repeat that is between 10 and 500 amino acid residues in length. In some embodiments, a RAN protein has a poly-amino acid repeat that is between 20 and 300 amino acid residues in length. In some embodiments, a RAN protein has a poly-amino acid repeat that is between 30 and 200 amino acid residues in length. In some embodiments, a RAN protein has a poly-amino acid repeat that is between 40 and 100 amino acid residues in length. In some embodiments, a RAN protein has a poly-amino acid repeat that is between 50 and 90 amino acid residues in length. In some embodiments, a RAN protein has a poly-amino acid repeat that is between 60 and 80 amino acid residues in length.

RAN protein-encoding sequences can be found in a subject's genome (e.g., a human subject's genome) at multiple loci, including, but not limited to, open reading frame 72 of chromosome 9 (C9orf72), open reading frame 80 of chromosome 2 (C2orf80), LRP8, CASP8, CRNDE, EXOC6B, SV2B, PPML1, ADARB2, GREB1, and MSMO1. The protein associated with C9orf72 is currently poorly characterized but known to be abundant in neurons, especially in the cerebral cortex and motor neurons. C9orf72 protein is believed to localized in presynaptic termini. C9orf72 protein likely impacts transcription, translation, and intra-cellular localization of RNA. The C9orf72 gene contains a GGGGCC repeat (a hexanucleotide repeat), which occurs in variable repeat numbers.

In the context of ALS/FTD, which results from a repeat expansion of the hexanucleotide sequence GGGGCC in the C9Orf72 gene, the following di-amino acid repeat-containing RAN proteins have been identified: poly-(Gly-Ala), poly-(Gly-Pro), poly-(Gly-Arg), poly-(Pro-Ala), or poly-(Pro-Arg), also referred to as poly(GA), poly(GP), poly(GR), poly(PA), and poly(PR), respectively. ALS/FTD RAN proteins are generally described, for example, in International PCT Application PCT/US2014/022670, filed on Mar. 10, 2014, published as WO2014/159247, and U.S. application Ser. No. 14/775,278, filed on Sep. 11, 2015, published as US2016/0025747, the entire contents of each of which are incorporated by reference herein. In the context of SCA36, which results from a repeat expansion of the hexanucleotide sequence TGGGCC in the SCA36 gene, the following di-amino acid repeat-containing RAN proteins have been identified: poly(GP) and poly(PR).

In the context of Huntington's disease (HD), RAN protein translation is caused by a CAG CTG expansion in the Htt gene, which results in translation of RAN proteins polyAlanine, polySerine, polyLeucine, and polyCysteine (polyAla, polySer, polyLeu and polyCys), in addition to poly-Glutamine (polyGln or polyQ).

In the context of SCA8 and DM1, RAN protein translation is caused by a CTGCAG repeat expansion. The SCA8 expansion mutation is bidirectionally transcribed and produces both CUG (ATXN8OS) and CAG (ATXN8) expansion RNAs, which are expressed in opposite directions across the expansion mutation. The CUG expansion transcripts form RNA foci, and the expanded CAG ATXN8 transcript expressed in the opposite direction produces a nearly pure polyGln protein from an unusually short ORF that contains an AUG-initiation codon directly upstream of the CAG repeat. This results in translation of the RAN proteins polyAlanine, polySerine, polyLeucine, and polyCysteine (polyAla, polySer, polyLeu and polyCys), in addition to poly-Glutamine (polyGln or polyQ).

In the context of Fragile X Syndrome (FXS) and Fragile X-associated tremor/ataxia syndrome (FXTAS), RAN protein translation is caused by a CGG•CCG expansion. Expansion of the CGG repeat tract in the 5' untranslated region (UTR) of the FMR1 gene causes two distinct diseases, depending on the length of the repeat. Larger expansions (>200 repeats) cause transcriptional silencing of the FMR1 gene resulting in FXS. In contrast, shorter alleles within the premutation range (55-200 repeats) cause FXTAS, a late-onset neurodegenerative disorder. This results in translation of RAN proteins polyGly, polyPro, polyArg, and polyAla.

In the context of DM2, RAN protein translation is caused by an intronic CCTG•CAGG expansion mutation located in the cellular nucleic acid binding protein (CNBP) gene, which produces tetrapeptide expansion proteins in both the sense (poly(leucine-proline-alanine-cysteine [LPAC])) and antisense (poly(glutamine-alanine-glycine-arginine [QAGR])) directions.

In the context of SCA31, RAN protein translation is caused by the accumulation of a UGGAA expansion-encoded Trp-Asn-Gly-Met-Glu (SEQ ID NO: 30) pentapeptide repeat protein (PPR).

In the context of SCA31, RAN protein translation is caused by the accumulation of a UGGAA expansion-encoded Trp-Asn-Gly-Met-Glu (SEQ ID NO: 30) pentapeptide repeat protein (PPR).

Other examples of RAN proteins may include poly(CP), poly(GD), poly(GE), poly(GQ), poly(GT), poly(LP), poly (LPAC (SEQ ID NO: 1)), poly(LS), poly(P), poly(RE), poly(SP), poly(VP), poly(FP), poly(GK), or any combination thereof. Examples of additional RAN proteins and methods of identifying RAN proteins are described, for example, in International PCT Application PCT/US2020/040725, filed on Jul. 2, 2020, the entire contents of which are incorporated herein by reference.

In some embodiments, the RAN protein is encoded by a gene associated with Huntington's disease (HD, HDL2), Alzheimer's disease (AD), Fragile X Syndrome (FRAXA), Spinal Bulbar Muscular Atrophy (SBMA), Dentatorubropallidoluysian Atrophy (DRPLA), Spinocerebellar Ataxia 1 (SCA1), Spinocerebellar Ataxia 2 (SCA2), Spinocerebellar Ataxia 3 (SCA3), Spinocerebellar Ataxia 6 (SCA6), Spinocerebellar Ataxia 7 (SCAT), Spinocerebellar Ataxia 8 (SCAB), Spinocerebellar Ataxia 12 (SCA12), or Spinocerebellar Ataxia 17 (SCA17), amyotrophic lateral sclerosis (ALS), Spinocerebellar ataxia type 36 (SCA36), Spinocerebellar ataxia type 29 (SCA29), Spinocerebellar ataxia type 10 (SCA10), myotonic dystrophy type 1 (DM1), myotonic dystrophy type 2 (DM2), or Fuch's Corneal Dystrophy (e.g., CTG181).

Subjects and Biological Samples

In some aspects, the disclosure relates to methods of detecting one or more anti-RAN protein antibodies (e.g., detecting the level of one or more anti-RAN protein antibodies) in a biological sample obtained from a subject. A subject can be a mammal (e.g., human, mouse, rat, dog, cat, or pig). In some embodiments, a subject is a mammalian subject. In some embodiments, the subject is a human. In some embodiments, a subject is a mouse. In some embodiments, a subject is a C9-BAC mouse. The C9-BAC mouse model of ALS is described, for example, in International PCT Application PCT/US2014/022670, filed on Mar. 10, 2014, published as WO2014/159247, and Liu et al., (2016) Neuron 90(3):521-34, the entire contents of each of which are incorporated herein by reference.

In some embodiments, a subject is characterized by a GGGGCC (e.g., $G_4C_2$) hexanucleotide sequence repeat expansion in the C9orf72 gene (e.g., a human C9orf72 gene or a gene, such as a mouse gene, corresponding to human C9orf72 gene). In some embodiments, a human C9orf72 gene comprises or consists of the sequence set forth in any one of NCBI Reference Sequence Numbers NM_145005.6, NM_018325.4, and NM_001256054.2. In some embodiments, a subject is characterized by a TGGGCC hexanucleotide sequence repeat expansion in the SCA36 gene (e.g., a human SCA36 gene or a gene, such as a mouse gene, corresponding to human SCA36 gene). In some embodiments, a human SCA36 gene comprises or consists of the sequence set forth in any one of NCBI Reference Sequence Numbers NM_006392.3, NR_027700.2, and NR_145428.1. In some embodiments, a subject has been determined to have a hexanucleotide sequence repeat expansion (e.g., a GGGGCC (e.g., $G_4C_2$) repeat expansion in C9Orf72 or a TGGGCC repeat expansion in SCA36) by a genetic assay (e.g., a DNA-based assay, for example a sequencing assay).

In some embodiments, a subject comprises at least 50, at least 100, at least 200, at least 500, at least 1000, or at least 5000 GGGGCC repeat expansions (e.g., repeat expansions of C9Orf72). In some embodiments, a subject comprises at least 50, at least 100, at least 200, at least 500, at least 1000, or at least 5000 TGGGCC repeat expansions (e.g., repeat expansions of SCA36).

In some embodiments, a subject is characterized by RAN protein translation or the presence of RNA aggregates containing di-amino acid repeat (DPR)-encoding transcripts. In some embodiments, the RAN proteins being translated in a subject comprise one or more of the following: poly(GA), poly(GP), poly(GR), poly(PA), or poly(PR). In some embodiments, the RAN proteins being translated in a subject comprise one or more of the following: poly(CP), poly(GD), poly(GE), poly(GQ), poly(GT), poly(LP), poly(LPAC (SEQ ID NO: 1)), poly(LS), poly(P), poly(QAGR (SEQ ID NO: 2)), poly(RE), poly(SP), poly(VP), poly(FP), poly(GK), or any combination thereof. In some embodiments, the poly (GA), poly(GP), poly(GR), poly(PA), poly(PR) RAN proteins are expressed from a C9Orf72, Htt, SCA36, LRP8, CASP8, and/or GREB1 expansion repeat of the subject. In some embodiments, the poly(CP), poly(GD), poly(GE), poly(GQ), poly(GT), poly(LP), poly(LPAC (SEQ ID NO: 1)), poly(LS), poly(P), poly(QAGR (SEQ ID NO: 2)), poly(RE), poly(SP), poly(VP), poly(FP), poly(GK) proteins are expressed from a C9Orf72, Htt, SCA36, LRP8, CASP8, and/or GREB1 expansion repeat of the subject.

Generally, a biological sample comprises blood, serum (e.g., plasma from which the clotting proteins have been removed), or cerebrospinal fluid (CSF). However, the skilled artisan will recognize other suitable biological samples, such as those comprising CNS tissue (e.g., brain tissue, spinal tissue, etc.) and/or cells (e.g., brain cells, neuronal cells, skin cells, etc.). In some embodiments, a biological sample comprises a blood sample or a tissue sample. In some embodiments, a blood sample comprises a whole blood, plasma, or serum sample. In some embodiments, a tissue sample comprises a CNS tissue or cerebrospinal fluid (CSF) sample. In some embodiments, a blood sample is treated to remove white blood cells (e.g., leukocytes), such as the buffy coat of the sample.

In some embodiments, the biological sample is diluted. In some embodiments, the biological sample is diluted prior to the detection of one or more anti-RAN protein antibodies. In some embodiments, the biological sample is diluted with a diluting agent. In some embodiments, the diluting agent is Phosphate-Buffered Saline (PBS) or Tris-Buffered Saline (TBST). In some embodiments, the biological sample is diluted such that the ratio of biological sample to diluting agent is 1:2, 1:3, 1:4, 1:5, 1:6, 1:7, 1:8, 1:9, 1:10, 1:15, 1:20, 1:25, 1:30, 1:35, 1:40, 1:45, 1:50, 1:60, 1:70, 1:80, 1:90, 1:100, 1:150, 1:200, 1:250, 1:300, 1:350, 1:400, 1:450, 1:500, 1:600, 1:700, 1:800, 1:900, 1:1000, 1:1250, 1:1500, 1:1750, or 1:2000, or any ratio contained therein. In some embodiments, the biological sample is diluted such that the percentage of biological sample present in the diluted sample is 0.0001, 0.0002, 0.0003, 0.0004, 0.0005, 0.0006, 0.0007, 0.0008, 0.0009, 0.001, 0.002, 0.003, 0.004, 0.005, 0.006, 0.007, 0.008, 0.009, 0.01, 0.011, 0.012, 0.013, 0.014, 0.015, 0.016, 0.107, 0.018, 0.019, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or more than 99%, or any value contained therein.

In some embodiments, a biological sample obtained from a subject is stored prior to the detection of one or more anti-RAN protein antibodies (e.g., prior to an assay being performed). In some embodiments, a biological sample obtained from a subject is stored at a temperature between −80° C. and about 23° C. (e.g., room temperature). In some embodiments, a biological sample obtained from a subject is stored at a temperature between 0° C. and about 23° C. (e.g., about 0, 1, 2, 3, 4, 5, 6, 7, 8, 9, 10, 11, 12, 13, 14, 15, 16, 17, 18, 19, 20, 21, 22, or 23° C.). In some embodiments, a biological sample obtained from a subject is stored at a temperature between 20° C. and about 25° C. (e.g., about 20, 21, 22, 23, 24, or 25° C.).

In some embodiments, a biological sample is obtained from a subject having or that is suspected of having a disease or disorder associated with RAN protein expression, translation, and/or accumulation. In some embodiments, a subject exhibits one or more signs or symptoms of a disease or disorder associated with RAN protein expression, translation, and/or accumulation. A "subject having or suspected of having a disease (e.g., neurological diseases) or disorder associated with RAN protein expression, translation, and/or accumulation" generally refers to a subject exhibiting one or more signs and symptoms of a neurodegenerative disease or disorder, including but not limited to memory deficit (e.g., short term memory loss), confusion, deficiencies of executive functions (e.g., attention, planning, flexibility, abstract thinking, etc.), loss of speech, degeneration or loss of motor skills, etc., or a subject having or being identified as having one or more genetic mutations associated with RAN protein expression, translation, and/or accumulation.

In some embodiments, the disease or disorder associated with RAN protein expression, translation, and/or accumulation is any one of amyotrophic lateral sclerosis (ALS), or frontotemporal dementia; myotonic dystrophy type 1 (DM1) and myotonic dystrophy type 2 (DM2); spinocerebellar ataxia types 1, 2, 3, 6, 7, 8, 10, 12, 17, 31, and 36; spinal bulbar muscular atrophy; dentatorubral-pallidoluysian atrophy (DRPLA); Huntington's disease (HD); Alzheimer's disease (AD); Fragile X Tremor Ataxia Syndrome (FXTAS); Fuch's endothelial corneal dystrophy (FECD); and Huntington's disease-like 2 syndrome (HDL2).

A "subject having or suspected of having ALS and/or FTD" can be a subject that is known or determined to have more than 30 GGGGCC repeats in the C9Orf72 gene, or a subject exhibiting signs and symptoms of ALS/FTD, including but not limited to: motor dysfunction (e.g., spasticity), muscle atrophy, and/or neuropsychiatric manifestations (e.g., compulsive behavior, apathy, anxiety. In some embodiments, a subject having ALS is characterized by having one or more mutations in a C9Orf72 gene.

A "subject having or suspected of having Alzheimer's disease" can be a subject exhibiting one or more signs and symptoms of AD, including but not limited to: memory deficit (e.g., short term memory loss), confusion, deficiencies of executive functions (e.g., attention, planning, flexibility, abstract thinking, etc.), loss of speech, degeneration or loss of motor skills, etc., or a subject having or being identified as having one or more genetic mutations associated with AD, for example mutations in specific genes including apolipoprotein (APP), presenillin genes (PSEN1 and PSEN2), or tau protein. In some embodiments, a subject having or suspected of having AD is characterized by the accumulation of β-amyloid (Aβ) peptides and hyper-phosphorylated tau protein throughout brain tissue of the subject. In some embodiments, a subject has been diagnosed as having AD by a medical professional, according to the NINCDS-ADRDA Alzheimer's Criteria, as described by McKhann et al., (1984) "Clinical diagnosis of Alzheimer's disease: report of the NINCDS-ADRDA Work Group under the auspices of Department of Health and Human Services Task Force on Alzheimer's Disease". Neurology, 34 (7): 939-44.

A "subject having or suspected of having myotonic dystrophy" (e.g., myotonic dystrophy type 1 (DM1) or myotonic dystrophy type 2 (DM2)) can be a subject exhibiting one or more signs or symptoms of DM1 and/or DM2, including but not limited to: delayed muscle relaxation, muscle weakness, prolonged involuntary muscle contraction, or loss of muscle; and/or abnormal heart rhythm, cataracts, or difficulty swallowing.

A "subject having or suspected of having spinocerebellar ataxia" (e.g., spinocerebellar ataxia types 1, 2, 3, 6, 7, 8, 10, 12, 17, 31, or 36) can be a subject exhibiting one or more signs or symptoms of spinocerebellar ataxia, including but not limited to: speech and swallowing difficulties, muscle stiffness (e.g., spasticity), weakness in the muscles that control eye movement (e.g., ophthalmoplegia), rapid, involuntary eye movements (e.g., nystagmus), uncoordinated movement and poor balance (e.g., ataxia), muscle wasting, slow eye movement, dementia, uncontrolled muscle tensing (e.g., dystonia), rigidity, tremors, bulging eyes, double vision, loss of coordination in arms, progressive vision loss, blindness, changes in sensation or reflexes, truncal instability, hyperactive tendon reflexes, scanning dysarthria characterized by a drawn-out slowness of speech, cerebellar ataxia, unsteady gait, upper-limb ataxia, dysphagia, gait dysfunction, extrapyramidal features, pyramidal weakness, cognitive and behavioral disturbances, chorea, psychiatric disturbances, sensorineural hearing impairment, impaired vibratory sensation, rapid eye movements (e.g., saccades), trouble moving the eyes side-to-side (e.g., oculomotor apraxia), and/or droopy eyelids (e.g., ptosis).

A "subject having or suspected of having spinal bulbar muscular atrophy" can be a subject exhibiting one or more signs or symptoms of spinal bulbar muscular atrophy, including but not limited to: speech impairment, difficulty chewing and swallowing, impaired sleep, difficulty breathing, facial muscle weakness, difficulty conveying emotion, weakness and atrophy of the arm and leg muscles, twitching and cramping of muscles, enlarged breasts (in male subjects), reduced fertility and atrophy (e.g., shrinkage) of the testicles, abnormal processing of male hormones, muscle wasting, and/or difficulty walking.

A subject "having or suspected of having dentatorubral-pallidoluysian atrophy (DRPLA)" can be a subject exhibiting one or more signs or symptoms of DRPLA, including but not limited to: ataxia, uncontrollable movements of the limbs (e.g., choreoathetosis), psychiatric symptoms (e.g., delusions), and/or deterioration of intellectual function (e.g., dementia).

A subject "having or suspected of having Huntington's disease (HD)" can be a subject exhibiting one or more signs or symptoms of HD, including but not limited to: abnormality walking, increased muscle activity, involuntary movements, problems with coordination, loss of muscle, muscle spasms, amnesia, delusion, lack of concentration, mental confusion, slowness in activity, difficulty thinking and understanding, compulsive behavior, fidgeting, irritability, lack of restraint, delirium, depression, hallucination, paranoia, anxiety, apathy, mood swings, difficulty speaking, memory loss, tremor, and/or weight loss.

A subject "having or suspected of having a Fragile X disorder" (e.g. Fragile X syndrome (FXS), Fragile X Tremor Ataxia Syndrome (FXTAS), or Fragile XE syndrome (FRAXE)) can be a subject exhibiting one or more signs or symptoms of FXS, FXTAS, and/or FRAXE, including but not limited to: aggression, hyperactivity, impulsivity, nonsense word repetition, repetitive movements, self-harm, persistent repetition of words or actions, learning disability or speech delay (e.g., in a child), flaccid muscles or problems with coordination, large ears, speech impairment, anxiety, double jointed limbs, enlarged head, enlarged testicles, flat feet, lazy eye, long thin face, prominent jaw, scoliosis, single line on palm, sleep disorder, sunken chest, tremor, neuropathy, numbness/tingling of the extremities, mood instability, irritability, explosive outbursts, personality changes, cognitive decline (including loss of skills such as math, reading, etc.), autonomic functioning problems (such as impotence and loss of bladder or bowel functions), delayed speech, poor writing skills, hyperactivity, and/or a short attention span.

A subject "having or suspected of having Huntington's disease-like 2 syndrome (HDL2)" can be a subject exhibiting one or more signs or symptoms of HDL2, including but not limited to: progressive movement disorder (e.g., parkinsonism, chorea), cognitive and emotional decline (e.g., dementia, psychiatric disturbances), epileptic seizure(s), and/or any other signs or symptoms associated with HD.

A subject "having or suspected of having Fuchs' endothelial corneal dystrophy (FECD)" can be a subject exhibiting one or more signs or symptoms of FECD, including but not limited to: blurred or cloudy vision (e.g., a general lack of clarity of vision), fluctuation in vision (e.g., worse symptoms in the morning after awakening and gradually improving during the day), permanent vision impairment, glare, seeing halos around lights, and/or pain or grittiness from tiny blisters on the surface of cornea.

Therapeutic Agents

Methods of the disclosure are useful, in some embodiments, for investigating the efficacy of a therapeutic agent (e.g., a therapeutic agent candidate) in an animal model of a disease or disorder associated with RAN protein expression, translation, and/or accumulation. A "therapeutic agent candidate" generally refers to an agent (e.g., small molecule, nucleic acid, interfering RNA, protein, peptide, antibody, vaccine, gene therapy vector, etc.) that is being tested for the ability to reduce or inhibit RAN protein expression, translation, and/or accumulation or for the ability to induce a protective immune response in a cell or subject. Therapeutic agents useful for treating a disease or disorder associated with RAN proteins may target (e.g., reduce expression, activity, accumulation, aggregation, etc.) a RAN protein or a nucleic acid encoding a RAN protein, and/or modulate the activity of another gene or gene product (e.g., protein) that interacts with one or more RAN proteins.

In some embodiments, a therapeutic agent is an anti-RAN protein antibody. An anti-RAN protein antibody can be an exogenously-administered antibody (e.g., an antibody therapeutically administered to the subject) or an endogenous antibody (e.g., an antibody produced by the cells of the subject). In some embodiments, an endogenous antibody is an autoantibody. In some embodiments, an endogenous antibody is produced by cells of the subject that are infected with an expression vector encoding the antibody. In some embodiments, an endogenous antibody is produced by the cells of the subject in response to being administered a vaccine. In some embodiments, an endogenous antibody is produced by the cells of the subject in response to the subject having an expansion mutation that expresses one or more types of RAN proteins (e.g., a subject having C9Orf72 ALS/FTD may produce antibodies, such as autoantibodies, to poly(GA), poly(GP), poly(GR), poly(PA), or poly(PR) proteins). As used herein, "anti-RAN protein antibodies" refers to both exogenously provided and endogenous anti-RAN protein antibodies. The skilled artisan will recognize that both exogenously provided and endogenous anti-RAN protein antibodies may be considered therapeutic agents.

In some embodiments, expression of anti-RAN protein antibodies reduces RAN protein expression relative to the level of RAN protein expression present in the subject prior to expression of anti-RAN protein antibodies. In some embodiments, expression of anti-RAN protein antibodies reduces RAN protein expression by one-fold, two-fold, three-fold, four-fold, five-fold, six-fold, seven fold-eight-fold, nine-fold, ten-fold, fifteen-fold, twenty-fold, thirty-fold, forty-fold, fifty-fold, sixty-fold, seventy-fold, eighty-fold, ninety-fold, one hundred-fold, or more than one-hundred fold relative to the level of RAN protein expression present in the subject prior to expression of anti-RAN protein antibodies. In some embodiments, expression of anti-RAN protein antibodies reduces RAN protein expression by 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 100%, or any percentage contained therein relative to the level of RAN protein expression present in the subject prior to expression of anti-RAN protein antibodies.

In some embodiments, expression of anti-RAN protein antibodies reduces RAN protein aggregation relative to the level of RAN protein aggregation present in the subject prior to expression of anti-RAN protein antibodies. In some embodiments, expression of anti-RAN protein antibodies reduces RAN protein aggregation by one-fold, two-fold, three-fold, four-fold, five-fold, six-fold, seven fold-eight-fold, nine-fold, ten-fold, fifteen-fold, twenty-fold, thirty-fold, forty-fold, fifty-fold, sixty-fold, seventy-fold, eighty-fold, ninety-fold, one hundred-fold, or more than one-hundred fold relative to the level of RAN protein aggregation present in the subject prior to expression of anti-RAN protein antibodies. In some embodiments, expression of anti-RAN protein antibodies reduces RAN protein aggregation by 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 100%, or any percentage contained therein relative to the level of RAN protein aggregation present in the subject prior to expression of anti-RAN protein antibodies.

In some embodiments, an anti-RAN protein antibody is an anti-poly(CP), anti-poly(GA), anti-poly(GP), anti-poly(PR), anti-poly(GR), anti-poly(PA), anti-poly(A), anti-poly(G), anti-poly(S), anti-poly(C), anti-poly(Q), anti-poly(GD), anti-poly(GE), anti-poly(GQ), anti-poly(GT), anti-poly(L), anti-poly(LP), anti-poly(LPAC (SEQ ID NO: 1)), anti-poly(LS), anti-poly(P), anti-poly(QAGR (SEQ ID NO: 2)), anti-poly(RE), anti-poly(SP), anti-poly(VP), anti-poly(FP), or anti-poly(GK) antibody, or any combination thereof. An anti-RAN protein antibody may bind to an extracellular RAN protein, an intracellular RAN protein, or both extracellular and intracellular RAN proteins.

In some embodiments, an anti-RAN protein antibody targets (e.g., specifically binds to) the amino acid repeat region of one or more RAN proteins selected from: poly(CP), poly(GA), poly(GP), poly(PR), poly(GR), poly(PA), poly(A), poly(G), poly(S), poly(C), poly(Q), poly(GD), poly(GE), poly(GQ), poly(GT), poly(L), poly(LP), poly(LPAC (SEQ ID NO: 1)), poly(LS), poly(P), poly(QAGR (SEQ ID NO: 2)), poly(RE), poly(SP), poly(VP), poly(FP), and/or poly(GK). In some embodiments, the target amino acid repeat region of the one or more RAN proteins comprises at least 20, at least 25, at least 30, at least 40, at least 50, at least 60, at least 70, at least 80, at least 90, at least 100, at least 200, at least 300, at least 400, at least 500, at least 1000, at least 1500, at least 2000, at least 3000, at least 4000, at least 5000, at least 10000, or more than 10000 amino acid residues. In some embodiments, the target amino acid repeat region of the one or more RAN proteins comprises more than 200 amino acid residues (e.g., 500, 1000, 5000, 10,000, or more than 10,000, etc.). In some embodiments, the target amino acid repeat region of the one or more RAN proteins is between 10 and 15,000 amino acids in length. In some embodiments, the target amino acid repeat region of the one or more RAN proteins is between 50 and 12,000 amino acids in length. In some embodiments, the target amino acid repeat region of the one or more RAN proteins is between 100 and 10,000 amino acids in length. In some embodiments, the target amino acid repeat region of the one or more RAN proteins is between 150 and 8,000 amino acids in length. In some embodiments, the target amino acid repeat region of the one or more RAN proteins is between 200 and 5,000 amino acids in length. In some embodiments, the target amino acid repeat region of the one or more RAN proteins is between 300 and 2,000 amino acids in length. In some embodiments, the target amino acid repeat region of the one or more RAN proteins is between 400 and 1,000 amino acids in length. In some embodiments, the target amino acid repeat region of the one or more RAN proteins is between 500 and 750 amino acids in length. In some embodiments, a RAN protein has a poly-amino acid repeat that is between 10 and 500 amino acid residues in length. In some embodiments, a RAN protein has a poly-amino acid repeat that is between 20 and 300 amino acid residues in length. In some embodiments, a RAN protein has a poly-amino acid repeat that is between 30 and 200 amino acid residues in length. In some embodiments, a RAN protein has a poly-amino acid repeat that is between 40 and 100 amino acid residues in length. In some embodiments, a RAN protein has a poly-amino acid repeat that is between 50 and 90 amino acid residues in length. In some embodiments, a RAN protein has a poly-amino acid repeat that is between 60 and 80 amino acid residues in length.

In some embodiments, an anti-RAN antibody targets (e.g., specifically binds to) any portion of a RAN protein that does not comprise the poly-amino acid repeat, for example the C-terminus of a RAN protein (e.g., the C-terminus of a poly(CP), poly(GA), poly(GP), poly(PR), poly(GR), poly(PA), poly(A), poly(G), poly(S), poly(C), poly(Q), poly(GD), poly(GE), poly(GQ), poly(GT), poly(L), poly(LP), poly(LPAC (SEQ ID NO: 1)), poly(LS), poly(P), poly(QAGR (SEQ ID NO: 2)), poly(RE), poly(SP), poly(VP), poly(FP), and/or poly(GK)). Examples of anti-RAN antibodies targeting the C-terminus of RAN protein are disclosed, for example, in U.S. Publication No. 2013/0115603, the entire content of which is incorporated herein by reference.

In some embodiments, a set (or combination) of anti-RAN antibodies (e.g., a combination of two or more anti-RAN antibodies selected from: poly(CP), poly(GA), poly(GP), poly(PR), poly(GR), poly(PA), poly(A), poly(G), poly(S), poly(C), poly(Q), poly(GD), poly(GE), poly(GQ), poly(GT), poly(L), poly(LP), poly(LPAC (SEQ ID NO: 1)), poly(LS), poly(P), poly(QAGR (SEQ ID NO: 2)), poly(RE), poly(SP), poly(VP), poly(FP), and poly(GK) antibodies, etc.) are administered to a subject for the purpose of treating a disease or disorder associated with RAN proteins.

A "C-terminal portion" or "C-terminus" of a RAN protein comprises the amino acid sequence encoded by a nucleotide sequence downstream of the poly-amino acid repeat region within the intron of a gene (e.g., C9Orf72, HTT, DM1, SCA36, LRP8, CASP8, GREB1, etc.) for the sense transcript or a nucleotide sequence downstream of the poly-amino acid repeat region within the intron of a gene (e.g., C9Orf72, HTT, DM1, SCA36, LRP8, CASP8, GREB1, etc.) for the anti-sense transcript.

In some embodiments, the C-terminal portion of a RAN protein comprises one or more contiguous amino acids in a sequence which begins at the amino acid immediately following the poly-amino acid repeat portion of the RAN protein and which is encoded by the sense transcript of the gene (e.g., C9Orf72, HTT, DM1, SCA36, LRP8, CASP8, GREB1, etc.). In some embodiments, the C-terminal portion of a RAN protein comprises one or more contiguous amino acids in a sequence which begins at the amino acid immediately following the poly-amino acid repeat portion of the RAN protein and which is encoded by the antisense transcript of the gene (e.g., C9Orf72, HTT, DM1, SCA36, LRP8, CASP8, GREB1, etc.).

In some embodiments, the C-terminal portion of a RAN protein comprises 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, or more than 75 contiguous amino acids in a sequence which begins at the amino acid immediately following the poly-amino acid repeat portion of the RAN protein. In some embodiments, the C-terminal portion of a RAN protein comprises 1-5, 3-10, 5-15, 8-20, 10-25, 13-30, 15-35, 18-40, 20-45, 23-50, 25-55, 28-60, 30-65, 33-70, 35-75, or more than 75 contiguous amino acids in a sequence which begins at the amino acid immediately following the poly-amino acid repeat portion of the RAN protein.

An anti-RAN antibody can be a polyclonal antibody or a monoclonal antibody. Typically, polyclonal antibodies are produced by inoculation of a suitable mammal, such as a mouse, rabbit or goat. Larger mammals are often preferred as the amount of serum that can be collected is greater. An antigen is injected into the mammal. This induces the B-lymphocytes to produce IgG immunoglobulins specific for the antigen. This polyclonal IgG is purified from the mammal's serum. Monoclonal antibodies are generally produced by a single cell line (e.g., a hybridoma cell line). In some embodiments, an anti-RAN antibody is purified (e.g., isolated from serum).

In some embodiments, a therapeutic agent is a RAN protein vaccine. A RAN protein vaccine generally comprises one or more peptide antigens that elicit an immune response (e.g., production of specific antibodies in the subject) to a RAN protein. In some embodiments, a therapeutic agent candidate is a vaccine configured to elicit an immune response against one or more RAN proteins (e.g., poly(CP), poly(GA), poly(GP), poly(PR), poly(GR), poly(PA), poly(A), poly(G), poly(S), poly(C), poly(Q), poly(GD), poly(GE), poly(GQ), poly(GT), poly(L), poly(LP), poly(LPAC (SEQ ID NO: 1)), poly(LS), poly(P), poly(QAGR (SEQ ID NO: 2)), poly(RE), poly(SP), poly(VP), poly(FP), and/or poly(GK) RAN proteins, etc.) expressed from an expansion repeat in the subject. In some embodiments, a therapeutic agent comprises a peptide antigen that targets one or more RAN proteins (e.g., is a RAN protein vaccine that targets one or more RAN proteins). In some embodiments, the peptide antigen targets (e.g., comprises an amino acid sequence encoding) one or more of the RAN proteins selected from: poly(CP), poly(GA), poly(GP), poly(PR), poly(GR), poly(PA), poly(A), poly(G), poly(S), poly(C), poly(Q), poly(GD), poly(GE), poly(GQ), poly(GT), poly(L), poly(LP), poly(LPAC (SEQ ID NO: 1)), poly(LS), poly(P), poly(QAGR (SEQ ID NO: 2)), poly(RE), poly(SP), poly(VP), poly(FP), and/or poly(GK) RAN proteins.

In some embodiments, administration of a RAN protein vaccine reduces RAN protein expression relative to the level of RAN protein expression present in the subject prior to administration of the RAN protein vaccine. In some embodiments, administration of a RAN protein vaccine reduces RAN protein expression by one-fold, two-fold, three-fold, four-fold, five-fold, six-fold, seven fold-eight-fold, nine-fold, ten-fold, fifteen-fold, twenty-fold, thirty-fold, forty-fold, fifty-fold, sixty-fold, seventy-fold, eighty-fold, ninety-fold, one hundred-fold, or more than one-hundred fold relative to the level of RAN protein expression present in the subject prior to administration of the RAN protein vaccine. In some embodiments, administration of a RAN protein vaccine reduces RAN protein expression by 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 100%, or any percentage contained therein relative to the level of RAN protein expression present in the subject prior to administration of the RAN protein vaccine.

In some embodiments, administration of a RAN protein vaccine reduces RAN protein aggregation relative to the level of RAN protein aggregation present in the subject prior to administration of the RAN protein vaccine. In some embodiments, administration of a RAN protein vaccine reduces RAN protein aggregation by one-fold, two-fold, three-fold, four-fold, five-fold, six-fold, seven fold-eight-fold, nine-fold, ten-fold, fifteen-fold, twenty-fold, thirty-fold, forty-fold, fifty-fold, sixty-fold, seventy-fold, eighty-fold, ninety-fold, one hundred-fold, or more than one-hundred fold relative to the level of RAN protein aggregation present in the subject prior to administration of the RAN protein vaccine. In some embodiments, administration of a RAN protein vaccine reduces RAN protein aggregation by 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 100%, or any percentage contained therein relative to the level of RAN protein aggregation present in the subject prior to administration of the RAN protein vaccine.

In some embodiments, one or more of the peptide antigens is a B-cell epitope. In some embodiments, a peptide antigen is a di-peptide repeat (DPR) peptide antigen. In some embodiments, a DPR peptide antigen comprises a $(GA)_x$ (SEQ ID NO: 4), $(GP)_x$ (SEQ ID NO:5), $(GR)_x$ (SEQ ID NO: 7), $(PA)_x$ (SEQ ID NO: 8) di-amino acid repeat, wherein x represents the number of repeat units of the antigen. In some embodiments, each of the one or more DPR peptide antigens comprises a $(CP)_x$ (SEQ ID NO:3), $(A)_x$ (SEQ ID NO:9), $(G)_x$ (SEQ ID NO:10), $(S)_x$ (SEQ ID NO: 11), $(C)_x$ (SEQ ID NO: 12), $(Q)_x$ (SEQ ID NO: 13), $(GD)_x$ (SEQ ID NO: 14), $(GE)_x$ (SEQ ID NO: 15), $(GQ)_x$ (SEQ ID NO:16), $(GT)_x$ (SEQ ID NO:17), $(L)_x$ (SEQ ID NO: 18), $(LP)_x$ (SEQ ID NO: 19), $(LPAC)_x$ (SEQ ID NO: 20), $(LS)_x$ (SEQ ID NO: 21), $(P)_x$ (SEQ ID NO: 22), $(QAGR)_x$ (SEQ ID NO: 23), $(RE)_x$ (SEQ ID NO: 24), $(SP)_x$ (SEQ ID NO: 25), $(VP)_x$ (SEQ ID NO: 26), $(FP)_x$ (SEQ ID NO: 27), and/or $(GK)_x$ (SEQ ID NO: 28) di-amino acid repeat, wherein x represents the number of repeat units of the antigen. In some embodiments, "x" is 5, 10, 15, 20, 25, 30, 35, 40, or more than 40 (e.g., 5, 10, 15, 20, 25, 30, 35, 40, or more than 40 repeat units). In some embodiments, a peptide antigen (e.g., a DPR peptide antigen) comprises between 2 and 150 (e.g., 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, or 150) amino acid repeats (e.g., different homopolymeric amino acid repeats, di-amino acid repeats, tri-amino acid repeats, tetra-amino acid repeats, penta-amino acid repeats, or any combination of the foregoing). In some embodiments, a peptide antigen (e.g., a DPR peptide antigen) comprises more than 50 amino acid repeats (e.g., different homopolymeric amino acid repeats, di-amino acid repeats, tri-amino acid repeats, tetra-amino acid repeats, penta-amino acid repeats, or any combination of the foregoing). In some embodiments, each DPR peptide antigen comprises between 10 di-amino acid repeats and 25 di-amino acid repeats. In some embodiments, a DPR peptide antigen comprises one of the following peptide antigens: $(GA)_{10}$ (SEQ ID NO: 4), $GA_{15}$ (SEQ ID NO: 4), $GR_{25}$ (SEQ ID NO: 7), $GP_{10}$ (SEQ ID NO: 5), $PR_{10}$ (SEQ ID NO: 6), or a combination thereof.

The number of peptide antigens of a RAN protein vaccine may vary (e.g., a RAN protein vaccine may be multivalent). In some embodiments, a RAN protein vaccine comprises peptide antigens to 2, 3, 4, 5, 6, 7, 8, 9, 10, 11, 12, or more different amino acid repeats (e.g., different homopolymeric amino acid repeats, di-amino acid repeats, tri-amino acid repeats, tetra-amino acid repeats, penta-amino acid repeats, or any combination of the foregoing). In some embodiments, a DPR peptide antigen comprises [$(GA)_{15}$ (SEQ ID NO: 4)+$(GR)_{25}$ (SEQ ID NO: 7)+$(PR)_{10}$ (SEQ ID NO: 6)] or [$(GA)_{15}$ (SEQ ID NO: 4)+$(GR)_{25}$ (SEQ ID NO: 7)+$(PR)_{10}$ (SEQ ID NO: 6)+$(GP)_{10}$ (SEQ ID NO: 5)].

Aspects of the disclosure relate to compositions (e.g., RAN protein vaccines, etc.) that comprise one or more (e.g., 1, 2, 3, 4, 5, 6, 7, 8, 9, 10, or more) additional immunogens. An "immunogen" refers to any antigen that is capable of inducing humoral and/or cell-mediated immune response rather than immunological tolerance. Examples of immunogens include but are not limited to keyhole limpet hemocyanin (KLH), Blue Carrier Immunogenic protein (CCH), bovine serum albumin (BSA), ovalbumin (OVA), diphtheria toxin, measles virus fusion protein (MVF), hepatitis B virus surface antigen (HB-sAg), tetanus toxin (TT), pertussis toxin (PT), or a portion of any of the foregoing.

An immunogen may comprise a T helper cell epitope. A "T helper cell epitope" or "Th epitope" refers to T cell epitopes that are presented on the surface of an antigen-presenting cell, where they are bound to MHC class II molecules and are 13 to 17 amino acids in length, which are specifically recognized by T helper cells. In some embodiments, inclusion of a Th epitope in a vaccine results in a biased Th2 type regulatory T cell response in preference to Th1 pro-inflammatory T cell response in a vaccinated subject. Inclusion of Th epitopes in peptide vaccines and UBITh epitopes are described, for example in Wang et al. (2007)

Vaccine 25(16):3041-52, and US 2019/0194280, the entire contents of which are incorporated herein by reference.

A peptide antigen and an additional immunogen (e.g., a B cell epitope and a T cell epitope) may be linked by any suitable modality. In some embodiments, the peptide antigen and the additional immunogen are covalently or non-covalently linked. In some embodiments, the peptide antigen and the additional immunogen are directly connected to one another. In some embodiments, a peptide antigen and an additional immunogen are linked via one or more (e.g., 1, 2, 3, 4, or more) linking molecules. In some embodiments, the conformational separation provided by one or more linking molecules permits more efficient interactions between the presented peptide antigen (e.g., DPR peptide antigen) and the appropriate Th cells and B cells, and thus enhances the immunogenicity of the peptide antigen (e.g., DPR peptide antigen) or cross-reactive functional immunological analogues thereof.

A linking molecule may provide a chemical linkage (e.g., linkage between one or more small molecules) or an amino acid linkage (e.g. linkage between amino acids, reactive groups of amino acids, hybridization, etc.), or a combination thereof. In some embodiments, a linking molecule comprises an amino acid linker. In some embodiments, a linking molecule is selected from the group consisting of an amino acid, Lys-, Gly-, Lys-Lys-Lys-, (α, ε-N)Lys, and ε-N-Lys-Lys-Lys-Lys (SEQ ID NO: 29).

In some embodiments, a RAN protein vaccine comprises one or more additional components, for example an N-terminal amide or signal peptide, or a C-terminal α-COOH or α-CONH$_2$.

A RAN protein vaccine or RAN protein immunogen may be formulated in a pharmaceutical composition. In some embodiments, the pharmaceutical composition comprises one or more pharmaceutically acceptable excipients. Pharmaceutical excipients are known, and are described for example by Remington, J. P. (1965). *Remington's Pharmaceutical Sciences*, Easton, Pa.: Mack Pub. Co., 19th ed., 1995. In some embodiments, a pharmaceutical composition comprising a vaccine includes one or more adjuvants. An adjuvant is a pharmacological or immunological agent that modifies the effect of other agents. Adjuvants may be added to a vaccine to boost the immune response to produce more antibodies and longer-lasting immunity, thus minimizing the dose of antigen needed. In some embodiments, an adjuvant is a mineral salt of aluminum. In some embodiments an adjuvant is alhydrogel (Al(OH)$_3$) or adjuphos (AlPO$_4$). Aluminum-based adjuvants are known, for example as described in Shardlow et al. (2018) Allergy, Asthma & Clinical Immunology, 14:80. In some embodiments, a pharmaceutical composition further comprises CpG. In some embodiments, the CpG is a CpG oligodeoxynucleotide (ODN), for example as described by Weiner, et al., (1997) *PNAS* 94(20):10833-7.

In some embodiments, one or more therapeutic molecules are administered to a subject to treat a disease or disorder associated with RAN proteins characterized by an expansion of a nucleic acid repeat (e.g., associated with a repeat associated non-ATG translation). For example, in some embodiments, a subject is administered 2, 3, 4, 5, 6, 7, 8, 9, or 10 therapeutic agents (e.g., proteins, nucleic acids, small molecules, etc., or any combination thereof).

Anti-RAN Protein Antibody Detection Assays

The disclosure is based, in part, on the surprising discovery that certain immunoassays (e.g., electrochemiluminescence-based immunoassays) can be used to detect one or more anti-RAN protein antibodies in a biological sample (e.g., blood, serum, CSF, etc.) obtained from a subject. In some embodiments, sample processing time and conditions (e.g., incubation time and incubation temperature) affect the amount of background signal observed in a given blood sample. For example if a serum sample is incubated (e.g., held or stored) at room temperature for more than 24 hours after being obtained from the subject, the levels of RAN proteins in the sample are, in some embodiments, indistinguishable from control samples due to high background signal.

In some embodiments, an immunoassay (e.g., an electrochemiluminescence-based immunoassay) is performed on a biological sample (e.g., a blood sample) within two days of being obtained from a subject. In some embodiments, an immunoassay (e.g., an electrochemiluminescence-based immunoassay) is performed on a biological sample (e.g., a blood sample) between about 1 minute and about 48 hours after being obtained from a subject. In some embodiments, an immunoassay (e.g., an electrochemiluminescence-based immunoassay) is performed on a biological sample (e.g., a blood sample) between about 60 minutes and about 24 hours after being obtained from a subject.

In some aspects, the disclosure provides a kit comprising one or more target di-amino acid repeat peptides, and an electrochemiluminescence-based immunoassay.

A "target di-amino acid repeat peptide" refers to a peptide comprising or consisting of a di-amino acid repeat sequence. In some embodiments, a target di-amino acid repeat peptide comprises a repeat selected from: poly(GP), poly(GA), poly(GR), and poly(PR). In some embodiments, a target di-amino acid repeat peptide comprises a repeat selected from: poly(CP), poly(GA), poly(GP), poly(PR), poly(GR), poly(PA), poly(A), poly(G), poly(S), poly(C), poly(Q), poly (GD), poly(GE), poly(GQ), poly(GT), poly(L), poly(LP), poly(LPAC (SEQ ID NO: 1)), poly(LS), poly(P), poly (QAGR (SEQ ID NO: 2)), poly(RE), poly(SP), poly(VP), poly(FP), and poly(GK).

In some embodiments, the length of a target di-amino acid repeat peptide ranges from about 4 amino acid residues (e.g., 2 di-amino acid repeats, such as "GPGP" (SEQ ID NO: 31)) to about 100 amino acid residues (e.g., 50 di-amino acid repeats, such as "GPGPGPGPGPGPGPGPGPGPGPGPGPG-PGPGPGPGPGPGPGPGPGPGPGPGPGPGPGPGPGP GPGPGPGPGPGPGPGPGPGPGPGPGPGPGP- GPGPGPGP" (SEQ ID NO: 32)). In some embodiments, a target di-amino acid repeat peptide comprises between 3 and 25 amino acid repeats (e.g., 3, 4, 5, 6, 7, 8, 9, 10, 11, 12, 13, 14, 15, 16, 17, 18, 19, 20, 21, 22, 23, 24, or 25 di-amino acid repeats). In some embodiments, a target di-amino acid repeat peptide comprises 8 di-amino acid repeats (e.g., (GA)$_8$ (SEQ ID NO: 4), (GP)$_8$ (SEQ ID NO: 5), (GR)$_8$ (SEQ ID NO: 7), (PR)$_8$ (SEQ ID NO: 6), etc.). In some embodiments, a target di-amino acid repeat peptide comprises at least 20, at least 25, at least 30, at least 40, at least 50, at least 60, at least 70, at least 80, at least 90, at least 100, at least 200, at least 300, at least 400, at least 500, at least 1000, at least 1500, at least 2000, at least 3000, at least 4000, at least 5000, at least 10000, or more than 10000 amino acid residues. In some embodiments, a target di-amino acid repeat peptide comprises a poly amino acid repeat more than 200 amino acid residues (e.g., 500, 1000, 5000, 10,000, or more than 10,000, etc.) in length. In some embodiments, the target amino acid repeat region of the one or more RAN proteins is between 10 and 15,000 amino acids in length. In some embodiments, the target amino acid repeat region of the one or more RAN proteins is between 50 and 12,000 amino acids in length. In some embodiments, the target amino acid repeat region of the one or more RAN proteins is between 100 and 10,000 amino acids in length. In some embodiments, the target amino acid repeat region of the one or more RAN proteins is between 150 and 8,000 amino acids in length. In some embodiments, the target amino acid repeat region of the one or more RAN proteins is between 200 and 5,000 amino acids in length. In some embodiments, the target amino acid repeat region of the one or more RAN proteins is between 300 and 2,000 amino acids in length. In some embodiments, the target amino acid repeat region of the one or more RAN proteins is between 400 and 1,000 amino acids in length. In some embodiments, the target amino acid repeat region of the one or more RAN proteins is between 500 and 750 amino acids in length. In some embodiments, a RAN protein has a poly-amino acid repeat that is between 10 and 500 amino acid residues in length. In some embodiments, a RAN protein has a poly-amino acid repeat that is between 20 and 300 amino acid residues in length. In some embodiments, a RAN protein has a poly-amino acid repeat that is between 30 and 200 amino acid residues in length. In some embodiments, a RAN protein has a poly-amino acid repeat that is between 40 and 100 amino acid residues in length. In some embodiments, a RAN protein has a poly-amino acid repeat that is between 50 and 90 amino acid residues in length. In some embodiments, a RAN protein has a poly-amino acid repeat that is between 60 and 80 amino acid residues in length.

Generally, an "electrochemiluminescence-based immunoassay" refers to a biological assay in which binding of one or more anti-RAN protein antibodies present in a biological sample to one or more target di-amino acid repeat peptides bound to a substrate, such as a microplate, are detected using electrochemiluminescent labels (e.g., detectable moieties) which emit light when stimulated by electricity in the appropriate chemical environment (e.g., in the presence of tripropylamine, TPrA). Electrochemiluminescent labels are described, for example by Muzyka (2014) *Biosens Bioelectron* 15(54):393-407.

In some embodiments, an electrochemiluminescence-based immunoassay is a Meso Scale Detection (MSD) assay. As used herein the term "Meso Scale Detection (MSD) assay" refers to an immunoassay used for detection of analytes by electrochemiluminescence (e.g., using one or more detectable reagents), such as SULFO-TAG™ labels (e.g., labels comprising one or more Ruthenium complexes) that emit light upon electrochemical stimulation, for example as described by Moxness et al. (2005) *Clin. Chem.* 51(10):1983-5, and U.S. Pat. No. 7,008,796, which are incorporated by reference with respect to description of MSD assay steps.

Generally, a MSD assay comprises contacting a solid substrate, for example a multi-well assay plate comprising one or more target peptides (e.g. one or more target di-amino acid repeat peptides) attached to the substrate, with a biological sample (e.g., a blood sample obtained from a subject that contains one or more anti-RAN protein antibodies), under conditions in which anti-RAN protein antibodies present in the biological sample bind to the one or more target peptides to form a complex, and subsequently contacting the complexes with one or more secondary antibodies (e.g., an antibody that binds to the anti-RAN protein antibody portion of the complex, such as an anti-human antibody, anti-mouse antibody, anti-rabbit antibody, etc., or an antibody that binds to the target peptide) that is conjugated to a detectable reagent. In some embodiments, a detectable reagent comprises an electrochemiluminescent moiety, for example as described in U.S. Pat. No. 5,310,687, which is incorporated herein by reference with respect to disclosure regarding such electrochemiluminescent moieties. In some embodiments, a detectable reagent comprises a Ruthenium complex, for example Ruthenium (II) tris-bipyridine-(4-methylsulfone), also referred to as $[Ru(Bpy)_3]^{+2}$, or a salt thereof.

A detectable reagent (e.g., a detectable moiety, for example a Ruthenium complex, such as a SULFO-TAG™) is generally conjugated to a secondary antibody (e.g., a detection antibody, such as an antibody that binds to an anti-RAN protein antibody or to an antigen present in the species from which the sample has been obtained, such as an anti-human antibody, anti-mouse antibody, anti-rat antibody, anti-guinea pig antibody, etc.).

In some aspects, the disclosure provides a method for measuring one or more anti-RAN protein antibodies in a sample (e.g., using a kit as described herein), the method comprising: (1) contacting a target di-amino acid repeat peptide with a biological sample obtained from a subject to form an anti-RAN antibody-target peptide complex; (2) contacting the anti-RAN antibody-target peptide complex with an electrochemiluminescent detection agent to form a labeled complex; and (3) measuring a level of one or more anti-RAN protein antibodies present in the sample by detecting electrochemiluminescence of the labeled complex.

In some embodiments a subject has previously been administered a therapeutic agent (or a therapeutic agent candidate) as described herein, for example a therapeutic anti-RAN protein antibody (e.g., a monoclonal antibody that specifically binds to a RAN protein), or has been exposed to a vaccine configured to elicit an immune response to RAN proteins in the subject (e.g., induce production of anti-RAN protein antibodies in the subject).

In some embodiments, an electrochemiluminescence-based immunoassay comprises a step of contacting the sample with one or more target di-amino acid repeat peptides to form a complex. In some embodiments, the one or more anti-RAN protein antibodies detected in a sample is selected from: an anti-poly(GA), anti-poly(GP), anti-poly(GR), and anti-poly(PR). In some embodiments, the one or more anti-RAN protein antibodies detected in a sample is selected from anti-poly(CP), anti-poly(GA), anti-poly(GP), anti-poly(PR), anti-poly(GR), anti-poly(PA), anti-poly(A), anti-poly(G), anti-poly(S), anti-poly(C), anti-poly(Q), anti-poly(GD), anti-poly(GE), anti-poly(GQ), anti-poly(GT), anti-poly(L), anti-poly(LP), anti-poly(LPAC (SEQ ID NO: 1)), anti-poly(LS), anti-poly(P), anti-poly(QAGR (SEQ ID NO: 2)), anti-poly(RE), anti-poly(SP), anti-poly(VP), anti-poly(FP), and/or anti-poly(GK) antibody. In some embodiments, two, three, or four anti-RAN protein antibodies are detected in a sample (e.g., poly(GP), poly(GR), poly(PR), and poly(GA), or any combination thereof).

An anti-RAN protein antibody can be a polyclonal antibody or a monoclonal antibody. In some embodiments, for example in the case of administration of a vaccine against a RAN protein-associated disease or disorder, the polyclonal antibodies may freely circulate in the serum of the animal. In some embodiments, a therapeutic anti-RAN protein antibody is a monoclonal antibody. In some embodiments, the antigen is 12-20 amino acids. For antibodies against repeat motifs, an antigen is a repeat sequence. For antibodies against C-terminal sequence of a RAN protein, an antigen is a C-terminal specific sequence. In some embodiments, an antigen is a portion of a C-terminal sequence, for example, a fragment of the C-terminal sequences that is 3-5 or 5-10, or more amino acids in length, for example, 6, 7, 8, 9, 10, 11, 12, 13, 14 15, 16, 17, 18, 19, 20, 25, 30, 35, 40, or 50 amino acids in length Accordingly, in some embodiments, methods and kits described by the disclosure are capable of measuring levels of anti-RAN protein antibodies in a subject over a specified time period (e.g., longitudinally over a course of treatment), thereby providing an assessment of therapeutic efficacy of certain treatments for diseases and disorders associated with RAN protein expression, translation, and/or accumulation (e.g., therapeutic agents for treating ALS/FTD). In some embodiments, the disease or disorder associated with RAN proteins is selected from the group consisting of: amyotrophic lateral sclerosis (ALS), or frontotemporal dementia; myotonic dystrophy type 1 (DM1) and myotonic dystrophy type 2 (DM2); spinocerebellar ataxia types 1, 2, 3, 6, 7, 8, 10, 12, 17, 31, and 36; spinal bulbar muscular atrophy; dentatorubral-pallidoluysian atrophy (DRPLA); Huntington's disease (HD); Alzheimer's disease (AD); Fragile X Tremor Ataxia Syndrome (FXTAS); Fuch's endothelial corneal dystrophy (FECD); Huntington's disease-like 2 syndrome (HDL2); Fragile X syndrome (FXS); disorders related to 7p11.2 folate-sensitive fragile site FRA7A; disorders related to folate-sensitive fragile site 2q11.2 FRA2A; and Fragile XE syndrome (FRAXE).

Without wishing to be bound by any theory, measuring an increased level of one or more anti-RAN protein antibodies in a subject after administration of a therapeutic agent for treatment of a disease or disorder associated with RAN protein expression, translation, and/or accumulation (e.g., ALS/FTD) (e.g., relative to the level of anti-RAN protein antibodies measured in the subject prior to the administration) is indicative of the therapeutic agent effectively treating the subject for the disease or disorder associated with RAN protein expression, translation, and/or accumulation (e.g., ALS/FTD). Measuring a decreased level of one or more anti-RAN protein antibodies in a subject after administration of a therapeutic agent for treatment of a disease or disorder associated with RAN protein expression, translation, and/or accumulation (e.g., ALS/FTD) (e.g., relative to the level of anti-RAN protein antibodies measured in the subject prior to the administration) is indicative of the therapeutic agent not effectively treating the subject for the disease or disorder associated with RAN protein expression, translation, and/or accumulation (e.g., ALS/FTD).

For example, in some embodiments, biological samples are obtained from a subject prior to and after (e.g., 1 week, 2 weeks, 1 month, 6 months, or one year after) commencement of a therapeutic regimen and the amount of anti-RAN protein antibodies detected in the samples is compared. In some embodiments, if the level (e.g., amount) of anti-RAN protein antibodies in the post-treatment sample is increased compared to the pre-treatment level (e.g., amount) of anti-RAN protein antibodies, the therapeutic regimen is successful. In some embodiments, if the level (e.g., amount) of anti-RAN protein antibodies in the post-treatment sample is decreased compared to the pre-treatment level (e.g., amount) of anti-RAN protein antibodies, the therapeutic regimen is not successful. In some embodiments, the level of anti-RAN protein antibodies in biological samples (e.g., 1, 2, 3, 4, 5, 6, 7, 8, 9, 10, or more than 10 samples) of a subject are continuously monitored during a therapeutic regimen (e.g., measured on 1, 2, 3, 4, 5, 6, 7, 8, 9, 10, or more than 10 separate occasions).

In some aspects, the disclosure provides a method for measuring pharmacokinetic changes in anti-RAN protein antibody levels in a subject, the method comprising: (1) detecting in a first biological sample obtained from a subject one or more anti-RAN protein antibodies using an electrochemiluminescence-based immunoassay; (2) detecting in a second biological sample obtained from the subject one or more anti-RAN protein antibodies using an electrochemiluminescence-based immunoassay, wherein the second biological sample is obtained after administration of a therapeutic agent to the subject; and (3) determining that administration of the therapeutic agent to the subject results in a change in one or more anti-RAN protein antibody levels in the subject if the amount of anti-RAN protein antibodies detected in the first biological sample is different than the amount of anti-RAN protein antibodies detected in the second biological sample. In some embodiments, the second biological sample contains an elevated level of anti-RAN protein antibodies relative to the first biological sample. In some embodiments, the second biological sample contains a decreased level of anti-RAN protein antibodies relative to the first biological sample.

As used herein, "elevated" means that the level of one or more anti-RAN antibodies present in a biological sample (e.g., a serum sample) is above a control level, such as a pre-determined threshold or a level of one or more anti-RAN protein antibodies in a control sample. Controls and control levels include anti-RAN protein antibody levels obtained (e.g., detected) from a subject that does not have or is not suspected of having a disease or disorder associated with RAN protein expression, translation, and/or accumulation (e.g., ALS/FTD and/or a subject having 30 or less repeats of a GGGGCC expansion). In some embodiments, a control or control level includes anti-RAN protein antibody levels prior to administration of a therapeutic agent (e.g., a therapeutic agent candidate). An elevated level includes a level that is, for example, 1%, 5%, 10%, 20%, 30%, 40%, 50%, 60%, 70%, 80%, 90%, 100%, 150%, 200%, 300%, 400%, 500%, or more above a control level. An elevated level also includes increasing a phenomenon from a zero state (e.g., no or undetectable anti-RAN protein antibody expression or level) to a non-zero state (e.g., some or detectable level of anti-RAN protein antibody expression or presence). In some embodiments, an increase (e.g., increase in the level of one or more anti-RAN protein antibody levels in the sample relative to a control or a prior sample) can be indicative of therapeutic efficacy of a therapeutic agent (e.g., therapeutic efficacy in the subject from which the sample was obtained).

As used herein, "unchanged or decreased" means that the level of one or more anti-RAN protein antibody is at or below a control level, such as a pre-determined threshold or a level of one or more anti-RAN protein antibodies in a control sample. Controls and control levels include RAN protein levels obtained (e.g., detected) from a subject that does not have or is not suspected of having a disease or disorder associated with RAN protein expression, translation, and/or accumulation (e.g., ALS/FTD, and/or a subject having 30 or less repeats of a GGGGCC expansion). In some embodiments, a control or control level includes anti-RAN protein antibody levels prior to administration of a therapeutic agent (e.g., an anti-RAN antibody or RAN protein vaccine). An unchanged level is a level that is the same as a control level. A decreased level includes a level that is, for example, 1%, 5%, 10%, 20%, 30%, 40%, 50%, 60%, 70%, 80%, 90%, 100%, 150%, 200%, 300%, 400%, 500%, or more than 500% below a control level. A decreased level also includes decreasing a phenomenon from a non-zero state (e.g., some or detectable anti-RAN protein antibody expression or presence) to a zero state (e.g., no or undetectable anti-RAN protein antibody expression or presence). In some embodiments, a lack of change or a decrease (e.g., lack of change or decrease in the level of one or more anti-RAN protein antibody levels in the sample relative to a control or a prior sample) can be indicative of a lack of therapeutic efficacy of a therapeutic agent (e.g., a lack of therapeutic efficacy in the subject from which the sample was obtained). In some embodiments, measuring a lack of change or a decreased level of one or more anti-RAN protein antibodies in a subject after administration of a therapeutic agent for the treatment of a disease or disorder associated with RAN protein expression, translation, and/or accumulation (e.g., ALS/FTD) (e.g., relative to the level of anti-RAN protein antibodies measured in the subject prior to the administration) is indicative of the therapeutic agent not effectively treating the subject for the disease or disorder associated with RAN protein expression, translation, and/or accumulation (e.g., ALS/FTD).

As used herein, a "change" in one or more anti-RAN protein antibody levels in the subject occurs if the amount of anti-RAN protein antibodies detected in the first biological sample is different than the amount of anti-RAN protein antibodies detected in the second biological sample. The amount of anti-RAN protein antibodies detected in the first biological sample is considered "different" than the amount of anti-RAN protein antibodies detected in the second biological sample when either an elevated or a decreased level of one or more anti-RAN protein antibodies is observed in the second biological sample.

In some embodiments, the first biological sample is a control sample (e.g., a control blood, serum, or CSF sample). In some embodiments, a control sample is a prior sample screened in the same subject having or suspected of having a RAN-protein associated disease or disorder (e.g., a sample taken from the same subject 1 hour earlier than the second sample, 1 day earlier, 2 days earlier, 3 days earlier, 4 days earlier, 5 days earlier, 6 days earlier, 1 week earlier, 2 weeks earlier, 3 weeks earlier, 1 month earlier, 2 months earlier, 3 months earlier, 6 months earlier, 1 year earlier, 2 years earlier, 3 years earlier, 4 years earlier, 5 years earlier, 10 years earlier, 20 years earlier, etc.). In some embodiments, a control sample is a later sample screened in the same subject having or suspected of having a RAN-protein associated disease or disorder (e.g., a sample taken from the same subject 1 hour later than the first sample, 1 day later, 2 days later, 3 days later, 4 days later, 5 days later, 6 days later, 1 week later, 2 weeks later, 3 weeks later, 1 month later, 2 months later, 3 months later, 6 months later, 1 year later, 2 years later, 3 years later, 4 years later, 5 years later, 10 years later, 20 years later, etc.). In some embodiments, the control sample is taken from a subject who has not been diagnosed with, and has no visible, noticeable, or otherwise phenotypic symptoms of, a RAN-protein associated disease or disorder (e.g., a healthy control subject). In some embodiments, a control sample is a sample taken from a different subject having a RAN-protein associated disease or disorder. In some embodiments, a control sample is a sample taken from a control subject that is matched (e.g., age-matched, gender-matched, etc.) to the subject having or suspected of having a RAN-protein associated disease or disorder.

The time between which a first biological sample and a second biological sample are obtained may vary. In some embodiments, a first biological sample is obtained between 1 week and 1 minute prior to administration of a therapeutic agent (e.g., the first administration of a therapeutic agent). In some embodiments, a first biological sample is obtained between 1 day (e.g., 24 hours) and 1 minute prior to administration of a therapeutic agent (e.g., the first administration of a therapeutic agent). In some embodiments, a second biological sample is obtained from the subject between 1 minute and six months after administration of a therapeutic agent (e.g., the first administration of a therapeutic agent). In some embodiments, a second biological sample is obtained from the subject between 1 day and 1 week after administration of a therapeutic agent (e.g., the first administration of a therapeutic agent). In some embodiments, a second biological sample is obtained from the subject between 1 day and 1 week after administration of a therapeutic agent (e.g., the most recent or last administration of a therapeutic agent).

In some embodiments, a second biological sample may be collected about 1 hour, 5 hours, 10 hours, 24 hours (e.g., 1 day), 48 hours (e.g., 2 days), 120 hours (e.g., 5 days), 30 days, 45 days, or six months after administration of the therapeutic agent. In some embodiments, several biological samples (e.g., 2, 3, 4, 5, 6, 7, 8, 9, 10, or more biological samples) are obtained from the subject, for example over a specified timeframe (e.g., during a therapeutic course), and one or more anti-RAN protein antibodies are detected.

In some embodiments, if the level (e.g., amount) of anti-RAN protein antibodies detected in the post-treatment sample is increased compared to the pre-treatment level (e.g., amount) of anti-RAN protein antibodies, the therapeutic regimen is successful. In some embodiments, if the level (e.g., amount) of anti-RAN protein antibodies detected in the post-treatment sample is decreased compared to the pre-treatment level (e.g., amount) of anti-RAN protein antibodies, the therapeutic regimen is not successful. In some embodiments, the level of anti-RAN protein antibodies in biological samples (e.g., 1, 2, 3, 4, 5, 6, 7, 8, 9, 10, or more than 10 samples) obtained from a subject are continuously monitored during a therapeutic regimen (e.g., measured on 1, 2, 3, 4, 5, 6, 7, 8, 9, 10, or more than 10 separate occasions).

Methods of Diagnosing and Treating Diseases and Disorders Associated with RAN Protein Translation Aspects of the disclosure relate to methods for identifying a subject (e.g., a human subject) as having or being at risk of developing certain neurodegenerative diseases and disorders associated with RAN protein expression, translation, and/or accumulation (e.g., ALS and/or FTD). In some embodiments, the disclosure provides a method for identifying a subject as having a disease or disorder associated with RAN protein expression, translation, and/or accumulation (e.g., ALS and/or FTD), the method comprising detecting in a biological sample obtained from a subject one or more anti-RAN protein antibodies using an electrochemiluminescence-based immunoassay; and determining that the subject has a disease or disorder associated with RAN protein expression, translation, and/or accumulation (e.g., ALS) based upon the presence of anti-RAN protein antibodies in the biological sample.

The disclosure relates, in some aspects, to methods of monitoring a therapeutic treatment course for a disease or disorder associated with RAN protein expression, translation, and/or accumulation, for example ALS/FTD, etc. In some aspects, the disclosure provides methods of treating a disease or disorder associated with RAN protein expression, translation, and/or accumulation comprising administering an effective amount of a therapeutic agent to a subject who has been determined to exhibit increased RAN protein expression, translation, and/or accumulation (e.g., relative to a subject not having a disease or disorder associated with RAN protein translation) and determining (e.g., detecting) levels of one or more anti-RAN protein antibodies as measured by an electrochemiluminescent immunoassay. In some embodiments, the subject has previously been administered a therapeutic agent (e.g., prior to the determining). In some embodiments, the therapeutic agent administered to the subject is different from the previously administered therapeutic agent. In some embodiments, a subject is administered an increased or decreased dose of a therapeutic agent based on detection of an elevated or reduced level of anti-RAN protein antibodies in a biological sample as measured by an electrochemiluminescent immunoassay.

Methods of treating, or modifying the existing treatment of, a disease or disorder associated with RAN protein expression, translation, and/or accumulation are also contemplated by the disclosure. In some embodiments, the disease or disorder associated with RAN proteins is selected from the group consisting of: amyotrophic lateral sclerosis (ALS), or frontotemporal dementia; myotonic dystrophy type 1 (DM1) and myotonic dystrophy type 2 (DM2); spinocerebellar ataxia types 1, 2, 3, 6, 7, 8, 10, 12, 17, 31, and 36; spinal bulbar muscular atrophy; dentatorubral-pallidoluysian atrophy (DRPLA); Huntington's disease (HD); Alzheimer's disease (AD); Fragile X Tremor Ataxia Syndrome (FXTAS); Fuch's endothelial corneal dystrophy (FECD); Huntington's disease-like 2 syndrome (HDL2); Fragile X syndrome (FXS); disorders related to 7p11.2 folate-sensitive fragile site FRA7A; disorders related to folate-sensitive fragile site 2q11.2 FRA2A; and Fragile XE syndrome (FRAXE). In some embodiments, a subject having been identified (e.g., a human subject) as having or being at risk of developing certain neurodegenerative diseases or disorders associated with RAN protein expression, translation, and/or accumulation by a method described by the disclosure is administered a therapeutic useful for treating a disease or disorder associated with RAN proteins.

In some embodiments, methods described by the disclosure comprise a step of administering (or continuing to administer) a therapeutic agent (e.g., an agent for treatment of a disease associated with RAN protein expression, translation, and/or accumulation, such as ALS/FTD, for example an anti-RAN antibody or a RAN protein vaccine) to the subject if the level of anti-RAN protein antibodies detected in the biological sample (e.g., the second biological sample) is elevated compared to a level of RAN proteins detected in a control sample (e.g., the first biological sample). In some embodiments, methods described by the disclosure comprise a step of stopping the administration of a therapeutic agent (e.g., an agent for treatment of a disease or disorder associated with RAN protein expression, translation, and/or accumulation, such as ALS/FTD) to the subject if the level of anti-RAN protein antibodies detected in the biological sample (e.g., the second biological sample) is decreased compared to a level of RAN proteins detected in a control sample (e.g., the first biological sample).

As used herein, "treat" or "treatment" refers to (a) preventing or delaying the onset of a disease or disorder associated with RAN protein expression, translation, and/or accumulation; (b) reducing the severity of a disease or disorder associated with RAN protein expression, translation, and/or accumulation; (c) reducing or preventing development of symptoms characteristic of a disease or disorder associated with RAN protein expression, translation, and/or accumulation; (d) preventing worsening of symptoms characteristic of a disease or disorder associated with RAN protein expression, translation, and/or accumulation; and/or (e) reducing or preventing recurrence of symptoms in subjects that were previously symptomatic for a disease or disorder associated with RAN protein expression, translation, and/or accumulation.

For example, in the context of ALS/FTD, "treat" or "treatment" refers to (a) preventing or delaying the onset of ALS and/or FTD; (b) reducing the severity of ALS and/or FTD; (c) reducing or preventing development of symptoms characteristic of ALS and/or FTD; (d) preventing worsening of symptoms characteristic of ALS and/or FTD; and/or (e) reducing or preventing recurrence of ALS and/or FTD symptoms in subjects that were previously symptomatic for ALS and/or FTD. Examples of therapeutic agents for the treatment of ALS/FTD include but are not limited to Riluzole (Rilutek, Sanofi-Aventis), trazodone (Desyrel, Oleptro), selective serotonin reuptake inhibitors (SSRIs), baclofen, diazepam, phenytoin, trihexyphenidyl, amitriptyline, anti-RAN antibodies, etc. Other therapeutic agents as described herein may also be used to treat ALS/FTD and any other disease or disorder associated with RAN protein expression, translation, and/or accumulation.

A subject may be administered a therapeutically effective amount of one or more therapeutic agents. As used herein, an "effective amount" is a dosage of a therapeutic agent sufficient to provide a medically desirable result, such as treatment or amelioration of one or more signs or symptoms caused by a disease or disorder associated with RAN protein expression, translation, and/or accumulation (e.g., a neurodegenerative disease or disorder). In some embodiments, a therapeutically effective amount is an amount of a RAN protein vaccine sufficient to elicit production of anti-RAN protein antibodies in a subject. In some embodiments, a therapeutically effective amount is an amount effective in increasing the amount of anti-RAN antibodies present in a sample obtained from the subject receiving treatment (e.g., relative to a subject not receiving treatment). In some embodiments, a therapeutically effective amount is an amount effective in reducing repeat expansions in the subject. In some embodiments, a therapeutically effective amount is an amount effective in reducing the transcription of RNAs that produce RAN proteins in a subject. In certain embodiments, a therapeutically effective amount is an amount effective in reducing the translation of RAN proteins in a subject. "Reducing" expression of a repeat sequence or RAN protein translation refers to a decrease in the amount or level of repeat sequence expression or RAN protein translation in a subject after administration of a therapeutic agent (and relative to the amount or level in the subject prior to the administration).

In certain embodiments, the effective amount is an amount effective in increasing the amount of anti-RAN antibodies present in a sample obtained from the subject receiving treatment by at least 10%, at least 20%, at least 30%, at least 40%, at least 50%, at least 60%, at least 70%, at least 80%, at least 90%, at least 95%, or at least 98% (e.g., the level of anti-RAN antibodies relative to the level of anti-RAN antibodies in a cell or subject that has not been administered a therapeutic agent). In certain embodiments, the effective amount is an amount effective in reducing the level of RAN proteins by at least 10%, at least 20%, at least 30%, at least 40%, at least 50%, at least 60%, at least 70%, at least 80%, at least 90%, at least 95%, or at least 98% (e.g., the level of RAN proteins relative to the level of RAN proteins in a cell or subject that has not been administered a therapeutic agent). In certain embodiments, the effective amount is an amount effective in reducing the translation of RAN proteins by at least 10%, at least 20%, at least 30%, at least 40%, at least 50%, at least 60%, at least 70%, at least 80%, at least 90%, at least 95%, or at least 98% (e.g., the level of RAN proteins relative the level of RAN proteins in a cell or subject that has not been administered a therapeutic agent).

The effective amount will vary with the age and physical condition of the subject being treated, the severity of the disease or disorder (e.g., the amount of RAN protein accumulation, or cellular toxicity caused by such an accumulation) in the subject, the duration of the treatment, the nature of any concurrent therapy, the specific route of administration, and other factors within the knowledge and expertise of the health practitioner. An effective amount may be included in a single dose (e.g., single oral dose) or multiple doses (e.g., multiple oral doses).

Generally and as described elsewhere herein, a therapeutic agent can be a small molecule (e.g., metformin or a metformin derivative), an interfering RNA (e.g., dsRNA, siRNA, miRNA, amiRNA, ASO, aptamer, etc.), protein or fragment thereof, peptide, antibody, such as an anti-RAN protein antibody, etc. In some embodiments, a therapeutic agent modulates RAN protein expression, for example by modulating a pathway that controls RAN protein expression, such as protein kinase R (PKR) pathway, EIF2 pathway, or EIF3 pathway. In some embodiments, a therapeutic agent is delivered by a viral vector, for example a lentiviral vector, retroviral vector, adenoviral vector, or adeno-associated virus (AAV) vector. In some embodiments, an anti-RAN protein peptide vaccine is delivered by a viral vector. In some embodiments, one or more viral vectors encoding an anti-RAN protein antibody or fragment thereof is delivered by a viral vector. In some embodiments, a therapeutic agent is delivered to a subject in a recombinant adeno-associated virus (rAAV) particle.

The identification and selection of appropriate additional therapeutic agents is within the capabilities of a person of ordinary skill in the art, and will depend upon the disease or disorder from which the subject is suffering. In some embodiments, one or more additional therapeutic agents for the treatment of ALS/FTD (e.g., Riluzole (Rilutek, Sanofi-Aventis), trazodone (Desyrel, Oleptro), selective serotonin reuptake inhibitors (SSRIs), baclofen, diazepam, phenytoin, trihexyphenidyl, amitriptyline, metformin, anti-RAN antibodies, etc.) are administered to the subject. In some embodiments, one or more additional therapeutic agents for HD (e.g., tetrabenazine (Xenazine), baclofen, and deutetrabenazine (Austedo), etc.), AD (e.g., cholinesterase inhibitors (Aricept®, Exelon®, Razadyne®) and memantine (Namenda®), etc.), Fragile X Syndrome (e.g., selective serotonin reuptake inhibitors, carbamazepine, methylphenidate, Trazodone, etc.), Spinocerebellar Ataxia (e.g., baclofen, riluzole, amantadine, varenicline, etc.), Fragile X Syndrome (e.g., sertraline, metformin, cannabidiol (CBD), acamprosate, lovastatin, minocycline, etc.), myotonic dystrophy type 1 (e.g., tideglusib, mexiletine, etc.), or myotonic dystrophy type 2 (e.g., Mexilitene, gabapentin, nonsteroidal anti-inflammatory drugs (NSAIDS), low-dose thyroid replacement, low-dose steroids, tricyclic antidepressants, etc.) are administered to the subject.

Administration of a treatment may be accomplished by any method known in the art (see, e.g., Harrison's Principle of Internal Medicine, McGraw Hill, Inc.). Administration may be local or systemic. A therapeutic agent can be administered by any route, including enteral (e.g., oral), parenteral, intravenous, intramuscular, intra-arterial, intramedullary, intrathecal, intratracheal, subcutaneous, intraventricular, transdermal, intradermal, ocular, rectal, intravaginal, intraperitoneal, topical (as by powders, ointments, creams, and/or drops), mucosal, nasal, buccal, sublingual, intratracheal instillation, bronchial instillation, inhalation, as an oral spray, as a nasal spray, and/or as an aerosol. Systemic routes include oral and parenteral. Specifically contemplated routes are oral administration, intravenous administration (e.g., systemic intravenous injection), regional administration via blood and/or lymph supply, and/or direct administration to an affected site. In some embodiments, a treatment as described by the disclosure is administered to a subject by intramuscular injection. In general, the most appropriate route of administration will depend upon a variety of factors including the nature of the agent (e.g., its stability in the environment of the gastrointestinal tract), and/or the condition of the subject (e.g., whether the subject is able to tolerate oral administration). In certain embodiments, the compound or pharmaceutical composition described herein is suitable for topical administration to the eye of a subject. Compositions for different routes of administration are well known in the art (see, e.g., Remington's Pharmaceutical Sciences by E. W. Martin).

In some embodiments, a treatment for a disease or disorder associated with RAN protein expression is administered to the central nervous system (CNS) of a subject in need thereof. As used herein, the "central nervous system (CNS)" refers to all cells and tissues of the brain and spinal cord of a subject, including but not limited to neuronal cells, glial cells, astrocytes, cerebrospinal fluid, etc. Modalities of administering a therapeutic agent to the CNS of a subject include direct injection into the brain (e.g., intracerebral injection, intraventricular injection, intraparenchymal injection, etc.), direct injection into the spinal cord of a subject (e.g., intrathecal injection, lumbar injection, etc.), or any combination thereof.

In some embodiments, a treatment as described by the disclosure is systemically administered to a subject, for example by intravenous injection. Systemically administered therapeutic molecules can be modified, in some embodiments, in order to improve delivery of the molecules to the CNS of a subject. Examples of modifications that improve CNS delivery of therapeutic molecules include but are not limited to co-administration or conjugation to blood brain barrier-targeting agents (e.g., transferrin, melanotransferrin, low-density lipoprotein (LDL), angiopeps, RVG peptide, etc., as disclosed by Georgieva et al. Pharmaceuticals 6(4): 557-583 (2014)), coadministration with BBB disrupting agents (e.g., bradykinins), and physical disruption of the BBB prior to administration (e.g., by MRI-Guided Focused Ultrasound), etc.

Dosage will depend on the subject and the route of administration. Dosage can be determined by the skilled artisan.

Without wishing to be bound by any particular theory, detection (e.g., quantification of anti-RAN protein antibodies) in the biological samples can be used to determine the effectiveness of a therapeutic agent or regime in the subject from which the samples are obtained.

Kits

In some aspects, the disclosure provides a kit comprising a first container containing one or more target di-amino acid repeat peptides and a second container containing one or more detectable reagents. In some embodiments, one or more anti-RAN antibodies bind to one or more target di-amino acid repeat peptides selected from: poly(GP) peptide, poly(GR) peptide, poly(PR) peptide, and poly(PA) peptides. In some embodiments, one or more anti-RAN antibodies bind to one or more target di-amino acid repeat peptides selected from: poly(CP), poly(GA), poly(GP), poly (PR), poly(GR), poly(PA), poly(A), poly(G), poly(S), poly (C), poly(Q), poly(GD), poly(GE), poly(GQ), poly(GT), poly(L), poly(LP), poly(LPAC (SEQ ID NO: 1)), poly(LS), poly(P), poly(QAGR (SEQ ID NO: 2)), poly(RE), poly(SP), poly(VP), poly(FP), and/or poly(GK) peptides. In some embodiments, the one or more detectable reagents comprise a Ruthenium complex, for example Ruthenium (II) tris-bipyridine-(4-methylsulfone), also referred to as [Ru(Bpy)$_3$]$^{+2}$, or a salt thereof. In some embodiments, a kit comprises a third container containing a control sample. A control sample may be a negative control sample (e.g., a control sample that does not contain, or lacks, one or more anti-RAN protein antibodies) or a positive control sample (e.g., a control sample that comprises one or more anti-RAN protein antibodies, optionally wherein the amount of the one or more anti-RAN protein antibodies in the sample is known).

EXAMPLE

This example describes methods of detecting anti-RAN protein antibodies in a biological sample obtained from a subject. The antibodies detected by methods described herein can be exogenously-administered antibodies (e.g., an antibody therapeutically administered to the subject) or an endogenous antibody (e.g., an antibody produced by the cells of the subject).

Assay Methods

A schematic depicting one embodiment of an assay for detection of RAN proteins in a biological sample is shown in FIG. 1. Briefly, a hydrophobic plate is coated with a target peptide (e.g., a target di-amino acid repeat peptide, such as a RAN peptide) and blocked with bovine serum albumin (BSA). A biological sample (e.g., lysate or serum obtained from a subject) is added to the plate, under conditions under which antibodies in the sample bind to the target peptide. Antibody-peptide complexes are labeled with a secondary detection agent (e.g., a detectable secondary antibody). Labeled complexes are then detected (e.g., using a plate reader, such as a Meso Scale Discovery (MSD) plate reader).

One embodiment of a method for detecting RAN proteins in a biological sample comprises the following steps. A multi-well assay plate (e.g., a Meso Scale Discovery (MSD) assay plate) is coated with 40 µl per well of a solution comprising target peptide diluted in 1×PBS (1 µg/ml). In this example, the target peptides were the di-amino acid repeat peptides $GP_8$ and $GA_8$. After addition of the solution, the plate is tapped to ensure that the solution distributes evenly across the bottom of each well. The plate is then sealed with adhesive seal and incubated overnight at 4° C. without shaking. The next day, plates are shaken to remove the solution. Plates are washed (e.g., with 1×TBST) and tapped dry. About 150 µl blocking solution (e.g., 3% w/v BSA diluted in 1×TBST) is then added to each well of the plate. The plate is sealed and incubated (e.g., at about 600 rpm) for 1 hour at room temperature, with shaking. Plates are then shaken, washed with 1×TBST, and tapped dry. About 25 µl of biological sample (e.g., tissue lysate or serum) is added to each well of the plate, which is then sealed and incubated with shaking (e.g., at about 600 rpm) for 2 hours at room temperature. Plates are then shaken, washed three times with 1×TBST, and tapped dry. About 250 of SULFO-TAG Detection Antibody diluted to 1 µg/ml in 1% BSA in TBST is added to each well of the plate and incubated for two hours at room temperature. Plates are then shaken, washed three times with 1×TBST, and tapped dry. About 150 µl per well of Tris-based buffer (e.g., 1×MSD Read Buffer T) diluted in water is added to the wells. When adding buffer, creation of bubbles is avoided by use of reverse pipetting. The plate is then read immediately using a microplate reader.

Detection of Therapeutic Anti-RAN Protein Antibodies in a Biological Sample

A subject (e.g., a human, non-human primate, dog, guinea pig, rat, mouse, etc.) is administered a therapeutic anti-RAN protein antibody, for example an antibody targeting a poly (GP), poly(GA), poly(GR), or poly(PR) RAN protein, or a combination thereof. Biological samples, such as serum samples, are collected after administration. Control subjects are administered delivery vehicle only. Biological samples are assayed using the method described in the example above.

Detection of Endogenous Anti-RAN Protein Antibodies in a Biological Sample

A subject (e.g., a human, non-human primate, dog, guinea pig, rat, mouse, etc.) is administered a viral vector encoding a therapeutic anti-RAN protein antibody (or a fragment thereof), for example an rAAV expressing an antibody targeting a poly(GP), poly(GA), poly(GR), or poly(PR) RAN protein, or a combination thereof. Biological samples, such as serum samples, are collected after administration. Control subjects are administered delivery vehicle only. Biological samples are assayed using the method described in the example above.

Detection of Anti-RAN Protein Antibodies in a Biological Sample Obtained from a Vaccinated Subject A subject (e.g., a human, non-human primate, dog, guinea pig, rat, mouse, etc.) is administered one or more peptide vaccines comprising an antigen having one or more di-amino acid repeat peptides (e.g., poly(GP), poly(GA), poly (GR), poly(PR), and combinations thereof). Biological samples, such as serum samples, are collected after administration. Control subjects are administered delivery vehicle only. Biological samples are assayed using the method described in the example above.

Detection of Anti-RAN Protein Antibodies in a Biological Sample Obtained from Mice A mouse model of C9Orf72 ALS (C9 Bac mouse) was administered vaccines targeting one or more di-amino acid repeat peptides (e.g., poly(GP), poly(GA), poly(GR), poly (PR), and combinations thereof). Animals were vaccinated 2-3 times before collection of biological samples. Control mice were administered adjuvant only. Biological samples were assayed using the method described in the example above.

Figure 2:
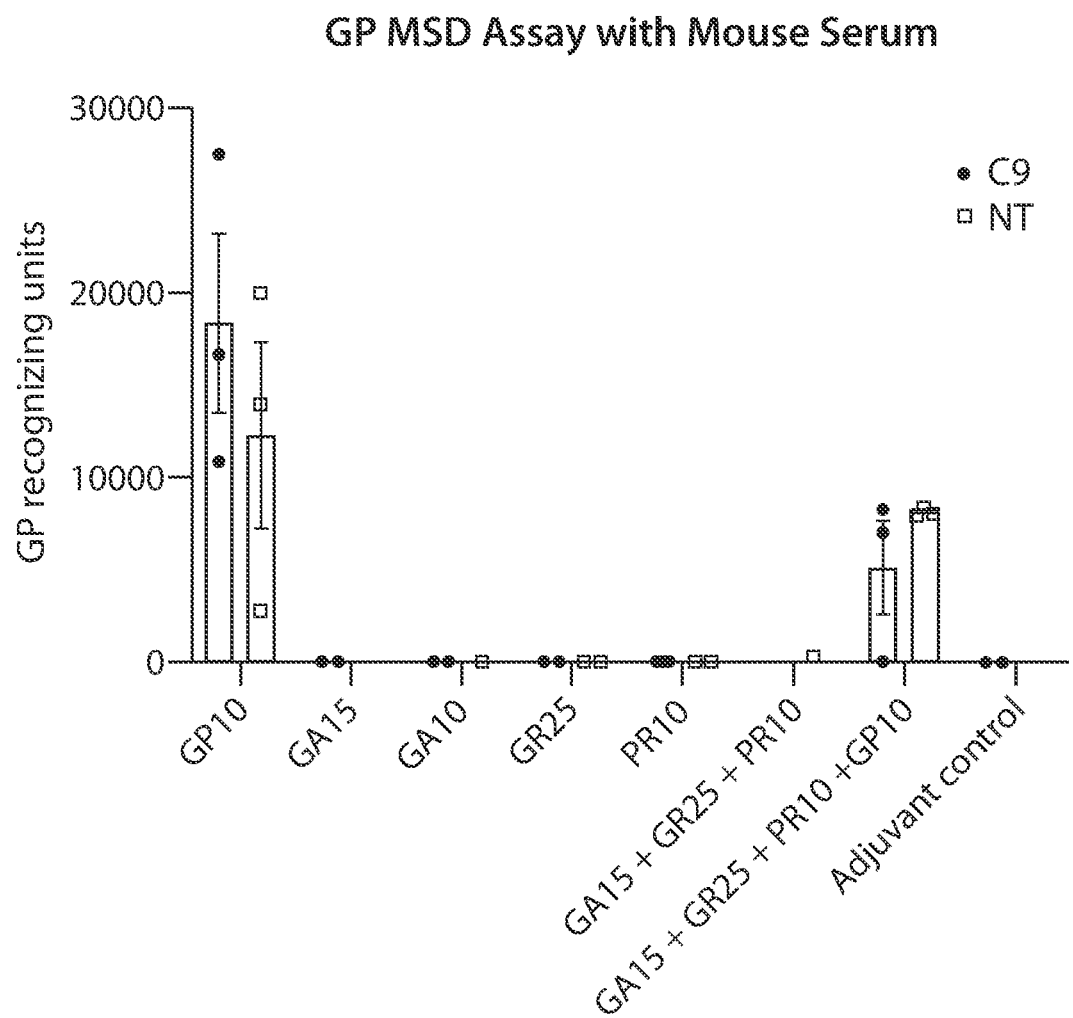
FIG. 2 shows representative data for detection of anti-poly(GP) antibodies in serum obtained from C9 Bac mice treated with anti-RAN protein vaccines. The assay plate was coated with $(GP)_8$ peptide and exposed to the serum after mice were exposed to 2-3 vaccines targeting the di-peptide repeats (DPRs) indicated: $GP_{10}$ (SEQ ID NO: 5), $GA_{15}$ (SEQ ID NO: 4), $GA_{10}$ (SEQ ID NO: 4), $GR_{25}$ (SEQ ID NO: 7), $PR_{10}$ (SEQ ID NO: 6), ($GA_{15}$ (SEQ ID NO: 4)+$GR_{25}$ (SEQ ID NO: 7)+$PR_{10}$ (SEQ ID NO: 6)), ($GA_{15}$ (SEQ ID NO: 4)+$GR_{25}$ (SEQ ID NO: 7)+$PR_{10}$ (SEQ ID NO: 6)+$GP_{10}$ (SEQ ID NO: 4)). Data from an adjuvant control mouse is also shown.

FIG. 2 shows representative data for detection of anti-poly(GP) antibodies in serum obtained from C9 Bac mice treated with anti-RAN protein vaccines. The assay plate was coated with $(GP)_8$ peptide and exposed to the serum after mice were exposed to 2-3 vaccines targeting the di-peptide repeats (DPRs) indicated: $GP_{10}$ (SEQ ID NO: 5), $GA_{15}$ (SEQ ID NO: 4), $GA_{10}$ (SEQ ID NO: 4), $GR_{25}$ (SEQ ID NO: 7), $PR_{10}$ (SEQ ID NO: 6), ($GA_{15}$ (SEQ ID NO: 4)+$GR_{25}$ (SEQ ID NO: 7)+$PR_{10}$ (SEQ ID NO: 6)), ($GA_{15}$ (SEQ ID NO: 4)+$GR_{25}$ (SEQ ID NO: 7)+$PR_{10}$ (SEQ ID NO: 6)+$GP_{10}$ (SEQ ID NO: 4)). Data from an adjuvant control mouse is also shown.

Figure 3:
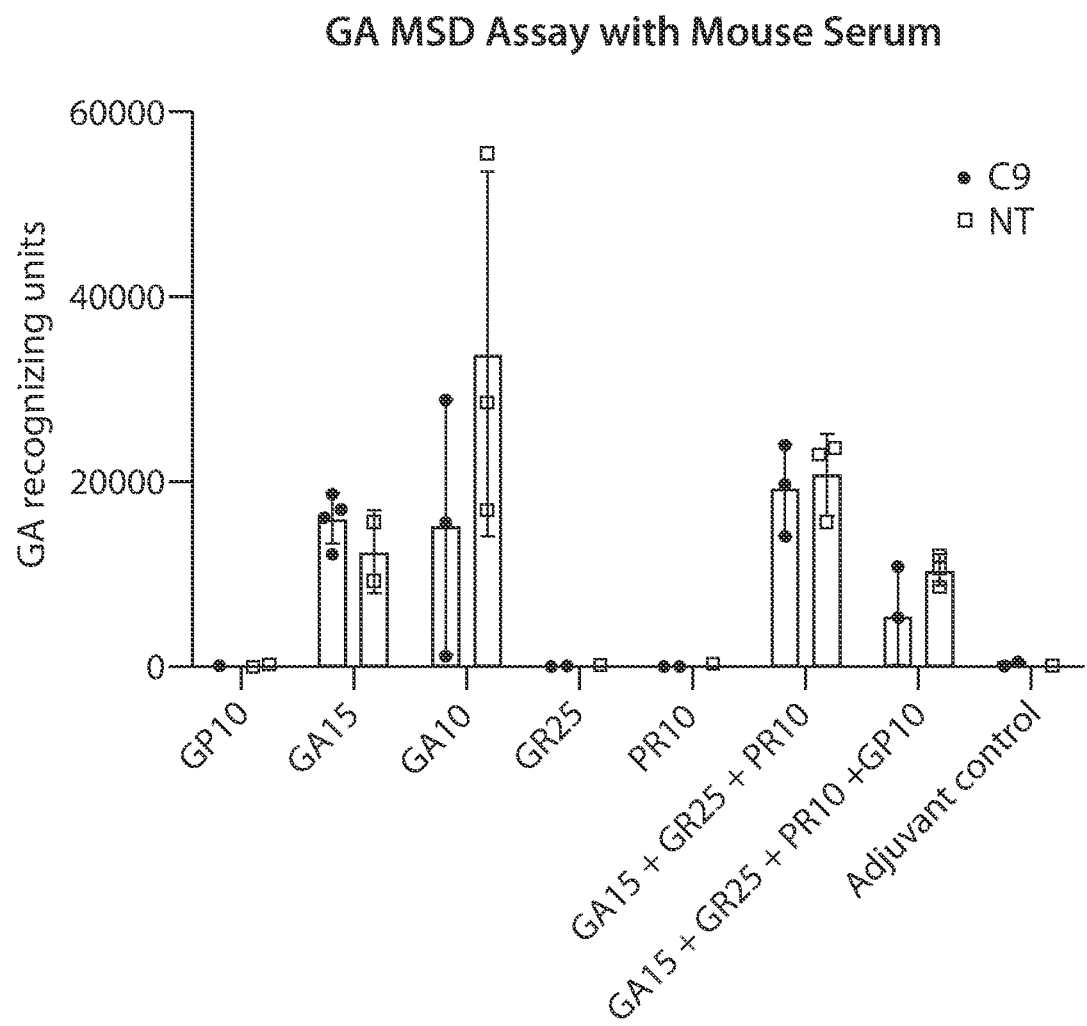
FIG. 3 shows representative data for detection of anti-poly(GA) antibodies in serum obtained from C9 Bac mice treated with anti-RAN protein vaccines. The assay plate was coated with $(GA)_8$ (SEQ ID NO: 4) peptide and exposed to the serum after mice were exposed to 2-3 vaccines targeting the di-peptide repeats (DPRs) indicated: $GP_{10}$ (SEQ ID NO: 5), $GA_{15}$ (SEQ ID NO: 4), $GA_{10}$ (SEQ ID NO: 4), $GR_{25}$ (SEQ ID NO: 7), $PR_{10}$ (SEQ ID NO: 6), ($GA_{15}$ (SEQ ID NO: 4)+$GR_{25}$ (SEQ ID NO: 7)+$PR_{10}$ (SEQ ID NO: 6)), ($GA_{15}$ (SEQ ID NO: 4)+$GR_{25}$ (SEQ ID NO: 7)+$PR_{10}$ (SEQ ID NO: 6)+$GP_{10}$ (SEQ ID NO: 4)). Data from an adjuvant control mouse is also shown.

FIG. 3 shows representative data for detection of anti-poly(GA) antibodies in serum obtained from C9 Bac mice treated with anti-RAN protein vaccines. The assay plate was coated with $(GA)_8$ (SEQ ID NO: 4) peptide and exposed to the serum after mice were exposed to 2-3 vaccines targeting the di-peptide repeats (DPRs) indicated: $GP_{10}$ (SEQ ID NO: 5), $GA_{15}$ (SEQ ID NO: 4), $GA_{10}$ (SEQ ID NO: 4), $GR_{25}$ (SEQ ID NO: 7), $PR_{10}$ (SEQ ID NO: 6), ($GA_{15}$ (SEQ ID NO: 4)+GR$_{25}$ (SEQ ID NO: 7)+PR$_{10}$ (SEQ ID NO: 6)), (GA$_{15}$ (SEQ ID NO: 4)+GR$_{25}$ (SEQ ID NO: 7)+PR$_{10}$ (SEQ ID NO: 6)+GP$_{10}$ (SEQ ID NO: 4)). Data from an adjuvant control mouse is also shown.

Figure 4:
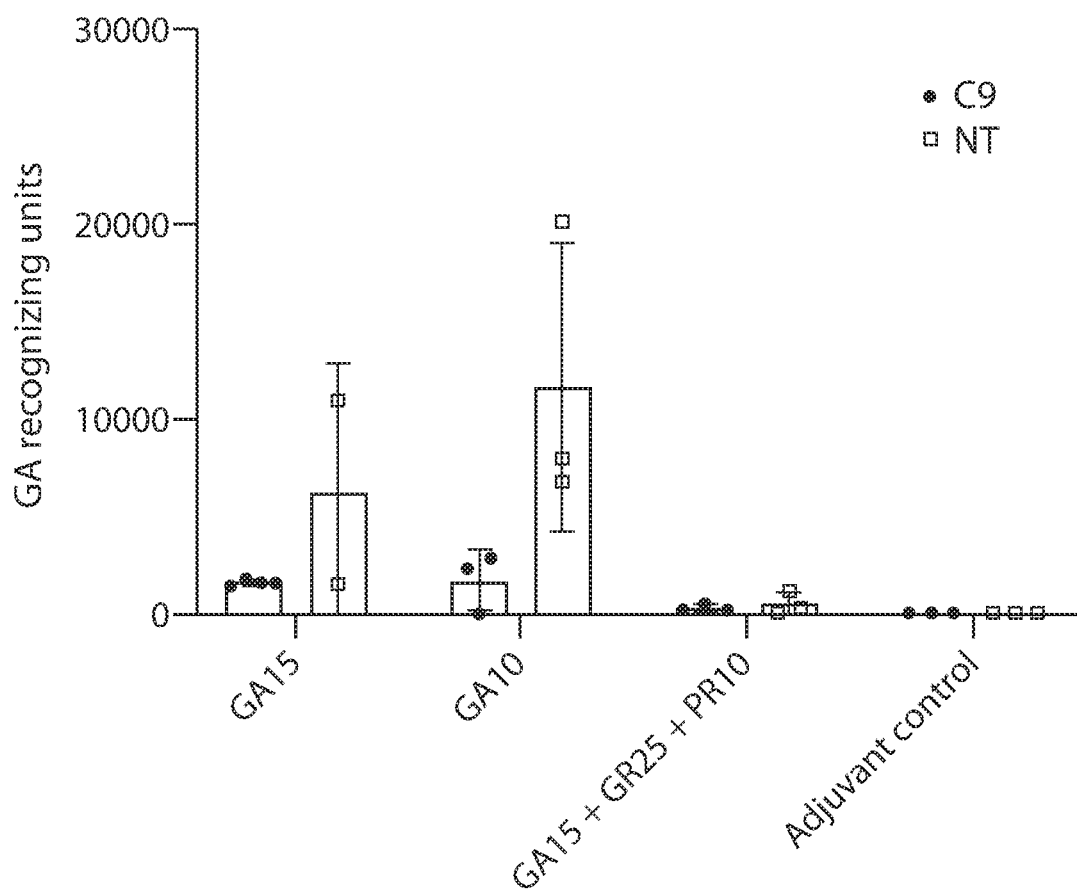
FIG. 4 shows representative data for detection of anti-poly(GA) antibodies in lysates from brain tissue obtained from C9 Bac mice treated with anti-RAN protein vaccines. The assay plate was coated with $(GA)_8$ (SEQ ID NO: 4) peptide and exposed to the serum after mice were exposed to 2-3 vaccines targeting the di-peptide repeats (DPRs) indicated: $GA_{15}$, $GA_{10}$, ($GA_{15}$ (SEQ ID NO: 4)+$GR_{25}$ (SEQ ID NO: 7)+$PR_{10}$ (SEQ ID NO: 6)). Data from an adjuvant control mouse is also shown.

FIG. 4 shows representative data for detection of anti-poly(GA) antibodies in lysates from brain tissue obtained from C9 Bac mice treated with an anti-RAN protein vaccines. The assay plate was coated with (GA)$_8$ (SEQ ID NO: 4) peptide and exposed to the serum after mice were exposed to 2-3 vaccines targeting the di-peptide repeats (DPRs) indicated: GA$_{15}$, GA$_{10}$, (GA$_{15}$ (SEQ ID NO: 4)+GR$_{25}$ (SEQ ID NO: 7)+PR$_{10}$ (SEQ ID NO: 6)). Data from an adjuvant control mouse is also shown.

Figure 5:
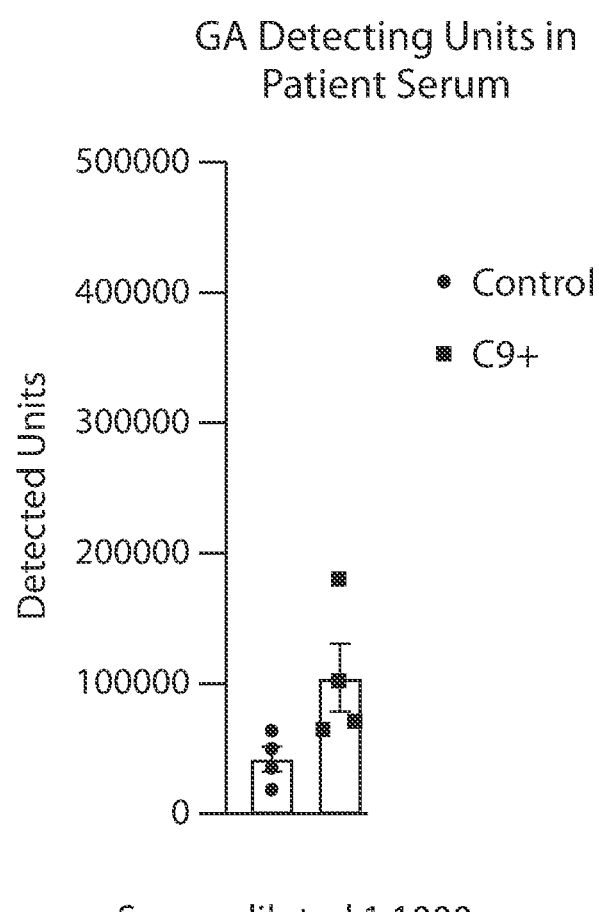
FIG. 5 shows representative data for detection of anti-poly(GA) antibodies in serum samples obtained from human C9+ ALS patients. The assay plate was coated with $(GA)_8$ (SEQ ID NO: 4) peptide and exposed to the serum.

Detection of Anti-RAN Protein Antibodies in a Biological Sample Obtained from ALS Patients Serum samples were obtained from patients having ALS characterized by a mutation of C9Orf72. Biological samples were assayed using the method described in the example above. Data indicates the presence of increased levels of anti-RAN protein antibodies in patient samples relative to control samples. FIG. 5 shows representative data for detection of anti-poly(GA) antibodies in serum samples obtained from human C9+ ALS patients. The assay plate was coated with (GA)$_8$ (SEQ ID NO: 4) peptide and exposed to the serum.

What is claimed is:

1. A method comprising:
   (i) detecting in a first biological sample obtained from a subject one or more anti-RAN protein antibodies using an electrochemiluminescence-based immunoassay;
   (ii) detecting in a second biological sample obtained from the subject one or more anti-RAN protein antibodies using an electrochemiluminescence-based immunoassay, wherein the second biological sample is obtained after administration of a therapeutic agent to the subject;
   (iii) comparing an amount of anti-RAN protein antibodies detected in the second biological sample to an amount of anti-RAN protein antibodies detected in the first biological sample;
   (iv) identifying the subject as having a change in one or more anti-RAN protein antibody levels when the amount of anti-RAN protein antibodies detected in the second biological sample is different than the amount of anti-RAN protein antibodies detected in the first biological sample; and
   (v) administering to the subject a vaccine against a RAN protein-associated disease or disorder when the second biological sample contains a decreased level of anti-RAN protein antibodies, relative to the first biological sample.

2. The method of claim 1, wherein the first biological sample and/or the second biological sample is a blood sample, serum sample, or a tissue sample, wherein the tissue sample is a CNS tissue or cerebrospinal fluid (CSF) sample.

3. The method of claim 1, wherein the one or more anti-RAN protein antibodies is an anti-poly(CP), anti-poly(GA), anti-poly(GP), anti-poly(PR), anti-poly(GR), anti-poly(PA), anti-poly(A), anti-poly(G), anti-poly(S), anti-poly(C), anti-poly(Q), anti-poly(GD), anti-poly(GE), anti-poly(GQ), anti-poly(GT), anti-poly(L), anti-poly(LP), anti-poly(LPAC (SEQ ID NO: 1)), anti-poly(LS), anti-poly(P), anti-poly(QAGR (SEQ ID NO: 2)), anti-poly(RE), anti-poly(SP), anti-poly(VP), anti-poly(FP), or anti-poly(GK) antibody, or any combination thereof.

4. The method of claim 1, wherein the subject is a mammalian subject, wherein the mammalian subject is a human or a mouse.

5. The method of claim 1, wherein the vaccine elicits an immune response against a RAN protein-associated disease or disorder associated with poly(CP), poly(GA), poly(GP), poly(PR), anti-poly(GR), poly(PA), poly(A), poly(G), poly(S), poly(C), poly(Q), poly(GD), poly(GE), poly(GQ), poly(GT), poly(L), poly(LP), anti-poly(LPAC (SEQ ID NO: 1)), poly(LS), poly(P), poly(QAGR (SEQ ID NO: 2)), anti-poly(RE), poly(SP), poly(VP), poly(FP), or poly(GK) RAN proteins.

6. The method of claim 1, wherein the RAN protein-associated disease or disorder is Amyotrophic Lateral Sclerosis (ALS), Frontotemporal Dementia (FTD), Myotonic Dystrophy Type 1 (DM1), Myotonic Dystrophy Type 2 (DM2), Spinocerebellar Ataxia Types 1, 2, 3, 6, 7, 8, 10, 12, 17, 31, and 36, Spinal Bulbar Muscular Atrophy, Dentatorubral-Pallidoluysian Atrophy (DRPLA), Huntington's Disease (HD), Alzheimer's Disease (AD), Fragile X Tremor Ataxia Syndrome (FXTAS), Fuchs' Endothelial Corneal Dystrophy (FECD), Huntington's Disease-Like 2 Syndrome (HDL2), Fragile X Syndrome (FXS), Fragile XE Syndrome (FRAXE), or is a disorder related to 7p11.2 folate-sensitive fragile site FRA7A or folate-sensitive fragile site 2q11.2 FRA2A.

7. The method of claim 1, wherein the vaccine elicits an immune response to one or more RAN proteins in the subject, wherein the one or more RAN proteins comprises at least 20, at least 25, at least 30, at least 40, at least 50, at least 60, at least 70, at least 80, at least 90, at least 100, at least 200, at least 300, at least 400, at least 500, at least 1000, at least 1500, at least 2000, at least 3000, at least 4000, at least 5000, at least 10000, or more than 10000 amino acid residues.

8. The method of claim 7, wherein the immune response comprises the production of endogenous antibodies in the subject, wherein the endogenous antibodies comprise one or more of an anti-poly(CP), anti-poly(GA), anti-poly(GP), anti-poly(PR), anti-poly(GR), anti-poly(PA), anti-poly(A), anti-poly(G), poly(S), anti-poly(C), anti-poly(Q), anti-poly (GD), anti-poly(GE), anti-poly(GQ), anti-poly(GT), anti-poly(L), anti-poly(LP), anti-poly(LPAC (SEQ ID NO: 1)), anti-poly(LS), anti-poly(P), anti-poly(QAGR (SEQ ID NO: 2)), anti-poly(RE), anti-poly(SP), anti-poly(VP), anti-poly (FP), or anti-poly(GK) antibody.

9. The method of claim 1, wherein the vaccine comprises one or more peptide antigens.

10. The method of claim 9, wherein the one or more peptide antigens:
(i) comprise one or more immunogens;
(ii) target one or more RAN proteins, wherein the one or more RAN proteins are one or more of a poly(CP), poly(GA), poly(GP), poly(PR), poly(GR), poly(PA), poly(A), poly(G), poly(S), poly(C), poly(Q), poly(GD), poly(GE), poly(GQ), poly(GT), poly(L), poly(LP), poly(LPAC (SEQ ID NO: 1)), poly(LS), poly(P), poly (QAGR (SEQ ID NO: 2)), poly(RE), poly(SP), poly (VP), poly(FP), and/or poly(GK) RAN protein;
(iii) comprise one or more repeat peptide antigens, wherein the one or more repeat peptide antigens comprise one or more of a $(CP)_x$ (SEQ ID NO:3), $(A)_x$ (SEQ ID NO:9), $(G)_x$ (SEQ ID NO:10), $(S)_x$ (SEQ ID NO: 11), $(C)_x$ (SEQ ID NO: 12), $(Q)x$ (SEQ ID NO: 13), $(GD)_x$ (SEQ ID NO: 14), $(GE)_x$ (SEQ ID NO: 15), $(GQ)_x$ (SEQ ID NO:16), $(GT)_x$ (SEQ ID NO:17), (L) x (SEQ ID NO: 18), $(LP)_x$ (SEQ ID NO: 19), $(LPAC)_x$ (SEQ ID NO: 20), $(LS)_x$ (SEQ ID NO: 21), $(P)_x$ (SEQ ID NO: 22), $(QAGR)_x$ (SEQ ID NO: 23), $(RE)_x$ (SEQ ID NO: 24), $(SP)_x$ (SEQ ID NO: 25), $(VP)_x$ (SEQ ID NO: 26), $(FP)_x$ (SEQ ID NO: 27), and/or $(GK)_x$ (SEQ ID NO: 28) repeat, wherein x represents the number of repeat units of the antigen, optionally wherein x is 5, 10, 15, 20, 25, 30, 35, or 40; and/or
(iv) comprise one or more of ($GA_{10}$ (SEQ ID NO: 4), $GA_{15}$ (SEQ ID NO: 4), $GR_{25}$ (SEQ ID NO: 7), $GP_{10}$ (SEQ ID NO: 5), $PR_{10}$ (SEQ ID NO: 6), or a combination thereof;
(v) comprise [$(GA)_{15}$ (SEQ ID NO: 4)+$(GR)_{25}$ (SEQ ID NO: 7)+$(PR)_{10}$ (SEQ ID NO: 6)];
(vi) comprise [$(GA)_{15}$ (SEQ ID NO: 4)+$(GR)_{25}$ (SEQ ID NO: 7)+$(PR)_{10}$ (SEQ ID NO: 6)+$(GP)_{10}$ (SEQ ID NO: 5)]; and/or
(vii) comprises a B-cell epitope.

11. The method of claim 10, wherein the one or more immunogens comprise one or more of Keyhole Limpet Hemocyanin (KLH), Blue Carrier Immunogenic protein (CCH), Bovine Serum Albumin (BSA), Ovalbumin (OVA), diphtheria toxin, Measles Virus Fusion protein (MVF), Hepatitis B virus surface antigen (HB-sAg), Tetanus Toxin (TT), Pertussis Toxin (PT), and/or a T cell helper epitope.

12. The method of claim 1, further comprising a step of continuing to administer the therapeutic agent to the subject and/or administering a second therapeutic agent to the subject, wherein the second therapeutic agent is a small molecule, nucleic acid, interfering RNA, protein, peptide, antibody, vaccine, gene therapy vector, or other immunogen.

13. The method of claim 12, wherein a third biological sample is obtained from the subject after continued administration of the therapeutic agent and/or administration of the second therapeutic agent, and one or more anti-RAN protein antibodies is detected in the third biological sample using an electrochemiluminescence-based immunoassay.

14. The method of claim 13, wherein the first and/or second and/or third biological sample is diluted prior to the detecting of one or more anti-RAN protein antibodies using a diluting agent, optionally wherein the diluting agent is Phosphate-Buffered Saline (PBS) or Tris-Buffered Saline (TBST), such that the ratio of biological sample to diluting agent is 1:10, 1:50, 1:100, 1:150, 1:200, 1:250, 1:300, 1:350, 1:400, 1:450, 1:500, 1:600, 1:700, 1:800, 1:900, 1:1000, 1:1250, 1:1500, 1:1750, or 1:2000.

15. The method of claim 1, wherein detecting the one or more anti-RAN protein antibodies using the electrochemiluminescence-based immunoassay in steps (i) and (ii) comprises a method comprising:
(i) contacting a target di-amino acid peptide repeat with the biological sample to form an anti-RAN antibody-target peptide complex, optionally wherein the target di-amino acid peptide repeat comprises at least 20, at least 25, at least 30, at least 40, at least 50, at least 60, at least 70, at least 80, at least 90, at least 100, at least 200, at least 300, at least 400, at least 500, at least 1000, at least 1500, at least 2000, at least 3000, at least 4000, at least 5000, at least 10000, or more than 10000 amino acid residues;
(ii) contacting the anti-RAN antibody-target peptide complex with an electrochemiluminescent detection agent to form a labeled complex; and
(iii) measuring a level of one or more anti-RAN protein antibodies present in the biological sample by detecting the electrochemiluminescence of the labeled complex.

16. The method of claim 15, wherein the electrochemiluminescent detection agent comprises Ruthenium (II) tris-bipyridine-(4-methylsulfone) or a SULFO-TAG™ and/or wherein the electrochemiluminescence is detected by a Meso Scale Detection (MSD) assay.

17. The method of claim 15, wherein the one or more anti-RAN protein antibodies comprises one or more of an anti-poly(CP), anti-poly(GA), anti-poly(GP), anti-poly(PR), poly(GR), anti-poly(PA), anti-poly(A), anti-poly(G), anti-poly(S), anti-poly(C), anti-poly(Q), anti-poly(GD), anti-poly(GE), anti-poly(GQ), anti-poly(GT), anti-poly(L), anti-poly(LP), anti-poly(LPAC (SEQ ID NO: 1)), anti-poly(LS), anti-poly(P), anti-poly(QAGR (SEQ ID NO: 2)), anti-poly (RE), anti-poly(SP), anti-poly(VP), anti-poly(FP), or anti-poly(GK) antibody.

18. A method comprising:
(i) detecting in a first biological sample obtained from a subject one or more anti-RAN protein antibodies using an electrochemiluminescence-based immunoassay;
(ii) detecting in a second biological sample obtained from the subject one or more anti-RAN protein antibodies using an electrochemiluminescence-based immunoassay, wherein the second biological sample is obtained after administration of a therapeutic agent to the subject;
(iii) comparing an amount of anti-RAN protein antibodies detected in the second biological sample to an amount of anti-RAN protein antibodies detected in the first biological sample;
(iv) identifying the subject as having a change in one or more anti-RAN protein antibody levels when the amount of anti-RAN protein antibodies detected in the second biological sample is different than the amount of anti-RAN protein antibodies detected in the first biological sample; and
(v) administering to the subject a vaccine against a RAN protein-associated disease or disorder when the second biological sample contains an increased level of anti-RAN protein antibodies, relative to the first biological sample.

19. The method of claim 18, wherein the subject is a human or a mouse.

20. The method of claim 18, wherein the vaccine comprises one or more peptide antigens.

* * * * *

```
                       SEQUENCE LISTING

<160> NUMBER OF SEQ ID NOS: 32

<210> SEQ ID NO 1
<211> LENGTH: 4
<212> TYPE: PRT
<213> ORGANISM: Artificial Sequence
<220> FEATURE:
<223> OTHER INFORMATION: Synthetic

<400> SEQUENCE: 1

Leu Pro Ala Cys
1

<210> SEQ ID NO 2
<211> LENGTH: 4
<212> TYPE: PRT
<213> ORGANISM: Artificial Sequence
<220> FEATURE:
<223> OTHER INFORMATION: Synthetic

<400> SEQUENCE: 2

Gln Ala Gly Arg
1

<210> SEQ ID NO 3
<211> LENGTH: 2
<212> TYPE: PRT
<213> ORGANISM: Artificial Sequence
<220> FEATURE:
<223> OTHER INFORMATION: Synthetic
<220> FEATURE:
<221> NAME/KEY: REPEAT
<222> LOCATION: (1)..(2)
<223> OTHER INFORMATION: May repeat 5, 10, 15, 20, 25, 30, 35, 40, or
      more than 40 times

<400> SEQUENCE: 3

Cys Pro
1

<210> SEQ ID NO 4
<211> LENGTH: 2
<212> TYPE: PRT
<213> ORGANISM: Artificial Sequence
<220> FEATURE:
<223> OTHER INFORMATION: Synthetic
<220> FEATURE:
<221> NAME/KEY: REPEAT
<222> LOCATION: (1)..(2)
<223> OTHER INFORMATION: May repeat 5, 8, 10, 15, 20, 25, 30, 35, 40, or
      more than 40 times

<400> SEQUENCE: 4

Gly Ala
```

-continued

```
<210> SEQ ID NO 5
<211> LENGTH: 2
<212> TYPE: PRT
<213> ORGANISM: Artificial Sequence
<220> FEATURE:
<223> OTHER INFORMATION: Synthetic
<220> FEATURE:
<221> NAME/KEY: REPEAT
<222> LOCATION: (1)..(2)
<223> OTHER INFORMATION: May repeat 5, 8, 10, 15, 20, 25, 30, 35, 40, or
      more than 40 times

<400> SEQUENCE: 5

Gly Pro
1

<210> SEQ ID NO 6
<211> LENGTH: 2
<212> TYPE: PRT
<213> ORGANISM: Artificial Sequence
<220> FEATURE:
<223> OTHER INFORMATION: Synthetic
<220> FEATURE:
<221> NAME/KEY: REPEAT
<222> LOCATION: (1)..(2)
<223> OTHER INFORMATION: May repeat 5, 8, 10, 15, 20, 25, 30, 35, 40, or
      more than 40 times

<400> SEQUENCE: 6

Pro Arg
1

<210> SEQ ID NO 7
<211> LENGTH: 2
<212> TYPE: PRT
<213> ORGANISM: Artificial Sequence
<220> FEATURE:
<223> OTHER INFORMATION: Synthetic
<220> FEATURE:
<221> NAME/KEY: REPEAT
<222> LOCATION: (1)..(2)
<223> OTHER INFORMATION: May repeat 5, 8, 10, 15, 20, 25, 30, 35, 40, or
      more than 40 times

<400> SEQUENCE: 7

Gly Arg
1

<210> SEQ ID NO 8
<211> LENGTH: 2
<212> TYPE: PRT
<213> ORGANISM: Artificial Sequence
<220> FEATURE:
<223> OTHER INFORMATION: Synthetic
<220> FEATURE:
<221> NAME/KEY: REPEAT
<222> LOCATION: (1)..(2)
<223> OTHER INFORMATION: May repeat 5, 10, 15, 20, 25, 30, 35, 40, or
      more than 40 times

<400> SEQUENCE: 8

Pro Ala
1

<210> SEQ ID NO 9
<211> LENGTH: 1
<212> TYPE: PRT
<213> ORGANISM: Artificial Sequence
```

```
<220> FEATURE:
<223> OTHER INFORMATION: Synthetic
<220> FEATURE:
<221> NAME/KEY: REPEAT
<222> LOCATION: (1)..(1)
<223> OTHER INFORMATION: May repeat 5, 10, 15, 20, 25, 30, 35, 40, or
      more than 40 times

<400> SEQUENCE: 9

Ala
1

<210> SEQ ID NO 10
<211> LENGTH: 1
<212> TYPE: PRT
<213> ORGANISM: Artificial Sequence
<220> FEATURE:
<223> OTHER INFORMATION: Synthetic
<220> FEATURE:
<221> NAME/KEY: REPEAT
<222> LOCATION: (1)..(1)
<223> OTHER INFORMATION: May repeat 5, 10, 15, 20, 25, 30, 35, 40, or
      more than 40 times

<400> SEQUENCE: 10

Gly
1

<210> SEQ ID NO 11
<211> LENGTH: 1
<212> TYPE: PRT
<213> ORGANISM: Artificial Sequence
<220> FEATURE:
<223> OTHER INFORMATION: Synthetic
<220> FEATURE:
<221> NAME/KEY: REPEAT
<222> LOCATION: (1)..(1)
<223> OTHER INFORMATION: May repeat 5, 10, 15, 20, 25, 30, 35, 40, or
      more than 40 times

<400> SEQUENCE: 11

Ser
1

<210> SEQ ID NO 12
<211> LENGTH: 1
<212> TYPE: PRT
<213> ORGANISM: Artificial Sequence
<220> FEATURE:
<223> OTHER INFORMATION: Synthetic
<220> FEATURE:
<221> NAME/KEY: REPEAT
<222> LOCATION: (1)..(1)
<223> OTHER INFORMATION: May repeat 5, 10, 15, 20, 25, 30, 35, 40, or
      more than 40 times

<400> SEQUENCE: 12

Cys
1

<210> SEQ ID NO 13
<211> LENGTH: 1
<212> TYPE: PRT
<213> ORGANISM: Artificial Sequence
<220> FEATURE:
<223> OTHER INFORMATION: Synthetic
<220> FEATURE:
<221> NAME/KEY: REPEAT
<222> LOCATION: (1)..(1)
<223> OTHER INFORMATION: May repeat 5, 10, 15, 20, 25, 30, 35, 40, or
      more than 40 times
```

```
<400> SEQUENCE: 13

Gln
1

<210> SEQ ID NO 14
<211> LENGTH: 2
<212> TYPE: PRT
<213> ORGANISM: Artificial Sequence
<220> FEATURE:
<223> OTHER INFORMATION: Synthetic
<220> FEATURE:
<221> NAME/KEY: REPEAT
<222> LOCATION: (1)..(2)
<223> OTHER INFORMATION: May repeat 5, 10, 15, 20, 25, 30, 35, 40, or
      more than 40 times

<400> SEQUENCE: 14

Gly Asp
1

<210> SEQ ID NO 15
<211> LENGTH: 2
<212> TYPE: PRT
<213> ORGANISM: Artificial Sequence
<220> FEATURE:
<223> OTHER INFORMATION: Synthetic
<220> FEATURE:
<221> NAME/KEY: REPEAT
<222> LOCATION: (1)..(2)
<223> OTHER INFORMATION: May repeat 5, 10, 15, 20, 25, 30, 35, 40, or
      more than 40 times

<400> SEQUENCE: 15

Gly Glu
1

<210> SEQ ID NO 16
<211> LENGTH: 2
<212> TYPE: PRT
<213> ORGANISM: Artificial Sequence
<220> FEATURE:
<223> OTHER INFORMATION: Synthetic
<220> FEATURE:
<221> NAME/KEY: REPEAT
<222> LOCATION: (1)..(2)
<223> OTHER INFORMATION: May repeat 5, 10, 15, 20, 25, 30, 35, 40, or
      more than 40 times

<400> SEQUENCE: 16

Gly Gln
1

<210> SEQ ID NO 17
<211> LENGTH: 2
<212> TYPE: PRT
<213> ORGANISM: Artificial Sequence
<220> FEATURE:
<223> OTHER INFORMATION: Synthetic
<220> FEATURE:
<221> NAME/KEY: REPEAT
<222> LOCATION: (1)..(2)
<223> OTHER INFORMATION: May repeat 5, 10, 15, 20, 25, 30, 35, 40, or
      more than 40 times

<400> SEQUENCE: 17

Gly Thr
1
```

```
<210> SEQ ID NO 18
<211> LENGTH: 1
<212> TYPE: PRT
<213> ORGANISM: Artificial Sequence
<220> FEATURE:
<223> OTHER INFORMATION: Synthetic
<220> FEATURE:
<221> NAME/KEY: REPEAT
<222> LOCATION: (1)..(1)
<223> OTHER INFORMATION: May repeat 5, 10, 15, 20, 25, 30, 35, 40, or
      more than 40 times

<400> SEQUENCE: 18

Leu
1

<210> SEQ ID NO 19
<211> LENGTH: 2
<212> TYPE: PRT
<213> ORGANISM: Artificial Sequence
<220> FEATURE:
<223> OTHER INFORMATION: Synthetic
<220> FEATURE:
<221> NAME/KEY: REPEAT
<222> LOCATION: (1)..(2)
<223> OTHER INFORMATION: May repeat 5, 10, 15, 20, 25, 30, 35, 40, or
      more than 40 times

<400> SEQUENCE: 19

Leu Pro
1

<210> SEQ ID NO 20
<211> LENGTH: 4
<212> TYPE: PRT
<213> ORGANISM: Artificial Sequence
<220> FEATURE:
<223> OTHER INFORMATION: Synthetic
<220> FEATURE:
<221> NAME/KEY: REPEAT
<222> LOCATION: (1)..(4)
<223> OTHER INFORMATION: May repeat 5, 10, 15, 20, 25, 30, 35, 40, or
      more than 40 times

<400> SEQUENCE: 20

Leu Pro Ala Cys
1

<210> SEQ ID NO 21
<211> LENGTH: 2
<212> TYPE: PRT
<213> ORGANISM: Artificial Sequence
<220> FEATURE:
<223> OTHER INFORMATION: Synthetic
<220> FEATURE:
<221> NAME/KEY: REPEAT
<222> LOCATION: (1)..(2)
<223> OTHER INFORMATION: May repeat 5, 10, 15, 20, 25, 30, 35, 40, or
      more than 40 times

<400> SEQUENCE: 21

Leu Ser
1

<210> SEQ ID NO 22
<211> LENGTH: 1
<212> TYPE: PRT
<213> ORGANISM: Artificial Sequence
<220> FEATURE:
<223> OTHER INFORMATION: Synthetic
<220> FEATURE:
```

```
<221> NAME/KEY: REPEAT
<222> LOCATION: (1)..(1)
<223> OTHER INFORMATION: May repeat 5, 10, 15, 20, 25, 30, 35, 40, or
      more than 40 times

<400> SEQUENCE: 22

Pro
1

<210> SEQ ID NO 23
<211> LENGTH: 4
<212> TYPE: PRT
<213> ORGANISM: Artificial Sequence
<220> FEATURE:
<223> OTHER INFORMATION: Synthetic
<220> FEATURE:
<221> NAME/KEY: REPEAT
<222> LOCATION: (1)..(4)
<223> OTHER INFORMATION: May repeat 5, 10, 15, 20, 25, 30, 35, 40, or
      more than 40 times

<400> SEQUENCE: 23

Gln Ala Gly Arg
1

<210> SEQ ID NO 24
<211> LENGTH: 2
<212> TYPE: PRT
<213> ORGANISM: Artificial Sequence
<220> FEATURE:
<223> OTHER INFORMATION: Synthetic
<220> FEATURE:
<221> NAME/KEY: REPEAT
<222> LOCATION: (1)..(2)
<223> OTHER INFORMATION: May repeat 5, 10, 15, 20, 25, 30, 35, 40, or
      more than 40 times

<400> SEQUENCE: 24

Arg Glu
1

<210> SEQ ID NO 25
<211> LENGTH: 2
<212> TYPE: PRT
<213> ORGANISM: Artificial Sequence
<220> FEATURE:
<223> OTHER INFORMATION: Synthetic
<220> FEATURE:
<221> NAME/KEY: REPEAT
<222> LOCATION: (1)..(2)
<223> OTHER INFORMATION: May repeat 5, 10, 15, 20, 25, 30, 35, 40, or
      more than 40 times

<400> SEQUENCE: 25

Ser Pro
1

<210> SEQ ID NO 26
<211> LENGTH: 2
<212> TYPE: PRT
<213> ORGANISM: Artificial Sequence
<220> FEATURE:
<223> OTHER INFORMATION: Synthetic
<220> FEATURE:
<221> NAME/KEY: REPEAT
<222> LOCATION: (1)..(2)
<223> OTHER INFORMATION: May repeat 5, 10, 15, 20, 25, 30, 35, 40, or
      more than 40 times

<400> SEQUENCE: 26
```

Val Pro
1

<210> SEQ ID NO 27
<211> LENGTH: 2
<212> TYPE: PRT
<213> ORGANISM: Artificial Sequence
<220> FEATURE:
<223> OTHER INFORMATION: Synthetic
<220> FEATURE:
<221> NAME/KEY: REPEAT
<222> LOCATION: (1)..(2)
<223> OTHER INFORMATION: May repeat 5, 10, 15, 20, 25, 30, 35, 40, or
      more than 40 times

<400> SEQUENCE: 27

Phe Pro
1

<210> SEQ ID NO 28
<211> LENGTH: 2
<212> TYPE: PRT
<213> ORGANISM: Artificial Sequence
<220> FEATURE:
<223> OTHER INFORMATION: Synthetic
<220> FEATURE:
<221> NAME/KEY: REPEAT
<222> LOCATION: (1)..(2)
<223> OTHER INFORMATION: May repeat 5, 10, 15, 20, 25, 30, 35, 40, or
      more than 40 times

<400> SEQUENCE: 28

Gly Lys
1

<210> SEQ ID NO 29
<211> LENGTH: 4
<212> TYPE: PRT
<213> ORGANISM: Artificial Sequence
<220> FEATURE:
<223> OTHER INFORMATION: Synthetic

<400> SEQUENCE: 29

Leu Leu Leu Leu
1

<210> SEQ ID NO 30
<211> LENGTH: 5
<212> TYPE: PRT
<213> ORGANISM: Artificial Sequence
<220> FEATURE:
<223> OTHER INFORMATION: Synthetic

<400> SEQUENCE: 30

Trp Asn Gly Met Glu
1               5

<210> SEQ ID NO 31
<211> LENGTH: 4
<212> TYPE: PRT
<213> ORGANISM: Artificial Sequence
<220> FEATURE:
<223> OTHER INFORMATION: Synthetic

<400> SEQUENCE: 31

Gly Pro Gly Pro
1

```
<210> SEQ ID NO 32
<211> LENGTH: 100
<212> TYPE: PRT
<213> ORGANISM: Artificial Sequence
<220> FEATURE:
<223> OTHER INFORMATION: Synthetic

<400> SEQUENCE: 32

Gly Pro Gly Pro Gly Pro Gly Pro Gly Pro Gly Pro Gly Pro Gly Pro
1               5                   10                  15

Gly Pro Gly Pro Gly Pro Gly Pro Gly Pro Gly Pro Gly Pro Gly Pro
            20                  25                  30

Gly Pro Gly Pro Gly Pro Gly Pro Gly Pro Gly Pro Gly Pro Gly Pro
        35                  40                  45

Gly Pro Gly Pro Gly Pro Gly Pro Gly Pro Gly Pro Gly Pro Gly Pro
    50                  55                  60

Gly Pro Gly Pro Gly Pro Gly Pro Gly Pro Gly Pro Gly Pro Gly Pro
65                  70                  75                  80

Gly Pro Gly Pro Gly Pro Gly Pro Gly Pro Gly Pro Gly Pro Gly Pro
            85                  90                  95

Gly Pro Gly Pro
            100
```